United States Patent
Miller et al.

(10) Patent No.: US 10,435,312 B2
(45) Date of Patent: Oct. 8, 2019

(54) FLUID TREATMENT SYSTEMS AND METHODS

(71) Applicant: BURST ENERGIES, INC., Dover, DE (US)

(72) Inventors: Stephen L. Miller, Nevada City, CA (US); Naresh Mahamuni, Nevada City, CA (US)

(73) Assignee: BURST ENERGIES INC., Dover ( * ) Notice: Subject to any disclaimer, the term of this patent is extended or adjusted under 35 U.S.C. 154(b) by 679 days.

(21) Appl. No.: 14/910,673

(22) PCT Filed: Aug. 6, 2014

(86) PCT No.: PCT/US2014/049943
§ 371 (c)(1),
(2) Date: Feb. 5, 2016

(87) PCT Pub. No.: WO2015/021156
PCT Pub. Date: Feb. 12, 2015

(65) Prior Publication Data
US 2016/0185624 A1 Jun. 30, 2016

Related U.S. Application Data

(60) Provisional application No. 61/862,959, filed on Aug. 6, 2013.

(51) Int. Cl.
*C02F 1/36* (2006.01)
*C02F 1/28* (2006.01)
(Continued)

(52) U.S. Cl.
CPC .............. *C02F 1/36* (2013.01); *C02F 1/28* (2013.01); *C02F 1/34* (2013.01); *C02F 1/281* (2013.01);
(Continued)

(58) Field of Classification Search
CPC .... C02F 1/36; C02F 1/28; C02F 1/281; C02F 1/286; C02F 1/285; C02F 1/34;
(Continued)

(56) References Cited

U.S. PATENT DOCUMENTS

| | | |
|---|---|---|
| 4,007,007 A | 2/1977 | Gazda |
| 2006/0027100 A1 | 2/2006 | Kozyuk |

(Continued)

FOREIGN PATENT DOCUMENTS

| | | |
|---|---|---|
| GB | 2273926 A | 7/1994 |
| WO | WO 2000-07941 | 2/2000 |

(Continued)

OTHER PUBLICATIONS

Office action related to Communication pursuant to Article 94(3) EPC for EP Application No. 14834099.5 dated Nov. 7, 2017, 4 pages.
(Continued)

*Primary Examiner* — Walter D. Griffin
*Assistant Examiner* — Cameron J Allen
(74) *Attorney, Agent, or Firm* — EcoTech Law Group, P.C.

(57) ABSTRACT

A multi-stage cavitation subassembly is described. The multi-stage cavitation subassembly includes: (i) a first cavitation-inducing feature for cavitating a fluid; (ii) a second cavitation-inducing feature that is located downstream from the first cavitation-inducing feature and is designed to cavitate the fluid after the fluid has undergone cavitation in the first cavitation-inducing feature; and (iii) a velocity-imparting component that, in a state of motion and when in contact with the fluid, imparts the fluid with sufficient velocity after the fluid has undergone cavitation in the first cavitation-
(Continued)

inducing feature so that the fluid traverses from the first cavitation-inducing feature to the second cavitation-inducing feature.

27 Claims, 18 Drawing Sheets

(51) Int. Cl.
    *C02F 1/34*     (2006.01)
    *C02F 103/00*     (2006.01)
    *C02F 103/10*     (2006.01)

(52) U.S. Cl.
    CPC .............. *C02F 1/285* (2013.01); *C02F 1/286* (2013.01); *C02F 2103/008* (2013.01); *C02F 2103/10* (2013.01); *C02F 2301/08* (2013.01); *C02F 2303/04* (2013.01); *C02F 2303/06* (2013.01)

(58) Field of Classification Search
    CPC ............ C02F 2301/08; C02F 2103/008; C02F 2103/10; C02F 2303/04; C02F 2303/06
    See application file for complete search history.

(56) References Cited

U.S. PATENT DOCUMENTS

| | | |
|---|---|---|
| 2006/0050608 A1 | 3/2006 | Kozyuk |
| 2009/0127207 A1* | 5/2009 | Okamoto ................ B63B 13/00 |
| | | 210/747.6 |
| 2010/0103768 A1 | 4/2010 | Gordon |
| 2013/0068700 A1* | 3/2013 | Mahamuni ................ C02F 1/36 |
| | | 210/748.03 |
| 2013/0248429 A1* | 9/2013 | Dahule .................... C02F 1/325 |
| | | 210/150 |
| 2013/0334113 A1* | 12/2013 | Erlich ................... E04H 4/1209 |
| | | 210/167.1 |
| 2014/0326681 A1* | 11/2014 | Denvir .................. C02F 1/4608 |
| | | 210/748.02 |

FOREIGN PATENT DOCUMENTS

| | | |
|---|---|---|
| WO | 2009-121371 A1 | 10/2009 |
| WO | WO 2012-098466 | 7/2012 |

OTHER PUBLICATIONS

Extended European Search Report for Application No. 14834099.5, dated Nov. 30, 2016, 9 pages.

Miller et al., PCT Application No. PCT/US2014/049943, Int'l Filing Aug. 6, 2014, International Search Report dated Nov. 18, 2014.

Miller et al., PCT Application No. PCT/US2014/049943, Int'l Filing Aug. 6, 2014, Written Opinion dated Nov. 18, 2014.

Miller et al., PCT Application No. PCT/US2014/049943, Int'l Filing Aug. 6, 2014, International Preliminary Report on Patentability dated Feb. 9, 2016.

* cited by examiner

FLUID TREATMENT SYSTEMS AND METHODS

RELATED APPLICATION

The application claims priority from U.S. Provisional Application having Ser. No. 61/862,959, filed on Aug. 6, 2013, which is incorporated herein by reference for all purposes.

FIELD OF THE INVENTION

The present invention relates generally to fluid and solid treatment systems and methods relating thereto. More particularly, the present invention relates to fluid and solid treatment systems and methods using cavitation.

BACKGROUND OF THE INVENTION

Cavitation is the formation, growth, and subsequent collapse of gas or vapor bubbles inside a fluid generated by changes in the hydrostatic or hydrodynamic conditions of a fluid. These changes in fluid conditions that lead to cavitation can be caused mechanically (e.g., using ultrasonic waves), optically (e.g., using laser beams), or by bombardment with high-energy particles (e.g., using fast-moving electrons or neutron particles). Regardless of how changes in hydrodynamic conditions are caused, different types of constrictions may be employed to cavitate a fluid. However, movement of large volumes of fluid at the requisite speed through each of these constrictions to effect hydrodynamic cavitation requires an extremely large energy input. As a result, achieving wastewater remediation from conventional hydrodynamic solutions remains impractical and exorbitantly expensive.

SUMMARY OF THE INVENTION

The present invention provides fluid treatment systems capable of treating large volumes of fluid using enhanced cavitation by increasing the amount of active cavitation in a given fluid flow. One aspect of the present arrangements provides a multi-stage cavitation subassembly. The multi-stage cavitation subassembly includes: (i) a first cavitation-inducing feature for cavitating a fluid; (ii) a second cavitation-inducing feature that is located downstream from the first cavitation-inducing feature and is designed to cavitate the fluid after the fluid has undergone cavitation in the first cavitation-inducing feature; and (iii) a velocity-imparting component that, in a state of motion and when in contact with the fluid, imparts the fluid with sufficient velocity after the fluid has undergone cavitation in the first cavitation-inducing feature so that the fluid traverses from the first cavitation-inducing feature to the second cavitation-inducing feature.

In certain embodiments of the present arrangements, during a rotational motion of the velocity-imparting component and when the fluid strikes the velocity-imparting component, the velocity-imparting component imparts the fluid with sufficient velocity so that the fluid may traverse from the first cavitation-inducing feature to the second cavitation-inducing feature. When the fluid strikes the velocity-imparting component, the velocity-imparting component may impart the fluid with velocity in a radial direction inside the multi-stage cavitation subassembly.

In one embodiment of the present arrangements, the velocity-imparting component is a rotating impeller and/or a rotating vane. Preferably, the rotating impeller is located proximate to a stationary stator with one or more slots disposed around a periphery of the stationary stator. In this configuration, the fluid propelled by the rotating impeller strikes and passes through one or more of the slots, which have a surface in the shape of one or more venturis (serving as fluid flow paths).

In one embodiment of the present arrangements, the first and the second cavitation-inducing features include a structure (e.g., a venturi) that produces hydrodynamic cavitation. The first cavitation-inducing feature and/or the second cavitation-inducing feature may be located on one member chosen from a group comprising static stator, vane and static body having defined therein multiple apertures that allow flow of the fluid. The vane may be coupled to a forward rotating plate and/or a rear rotating plate, each of which has defined therein a centrally located aperture to allow the fluid to be drawn in, flow through and contact the vane. In another embodiment of the present arrangements, the forward rotating plate is coupled to an upstream surface of the vane and/or the rear rotating plate is coupled to a downstream surface of the vane such that when the forward rotating plate and/or the rear rotating plate rotates when the vane rotates.

In another implementation of the present arrangements, first cavitation-inducing feature and/or the second cavitation-inducing feature may be fabricated on a static body, which is adjacent to one or more rotating vanes having defined therein one more apertures for receiving a fluid. In this embodiment, one or more of the apertures may be larger than the multiple apertures of the static body.

In certain another embodiments of the present arrangements, the multi-stage cavitation subassembly further includes a flow-guiding feature that guides fluid flow from the first cavitation-inducing feature to the second cavitation-inducing feature. In this embodiment, the flow-guiding feature is proximate the first cavitation-inducing feature or the second cavitation-inducing feature. In another arrangement, the flow-guiding feature may be proximate, but stationary relative to the velocity-imparting component when the velocity-imparting component is in motion. By way of example, the flow-guiding feature is an inner surface of a housing that guides the fluid present at a vacant region, which is located between a stationary stator and a housing surrounding a stationary stator, to another cavitation feature or site. However, in another embodiment of the present arrangements, the flow-guiding feature is proximate to the velocity-imparting component and the flow-guiding feature and the velocity-imparting component are both in motion. By way of example, the flow-guiding feature is a rotating venturi vane that allows a fluid to flow through it, and the fluid so guided passes through multiple cavitation features or sites. As another example, the flow-guiding feature comprises the blades of a rotating impeller that guide fluid flow through the slots of a stator that induce cavitation of the fluid.

In accordance with one embodiment of the present arrangements, the multi-stage cavitation subassembly may further include a shaft that, when coupled to the velocity-imparting component, enables motion of the fluid in a radial direction. In another embodiment of the present arrangements, the multi-stage cavitation subassembly may further include a motor, which enables motion of the velocity-imparting component. In yet another embodiment of the present arrangements, the multi-stage cavitation subassembly includes a fluid flow path that traverses through n number of multiple cavitation-inducing features and wherein n is a number that ranges from between about 12 and about 432.

The multi-stage cavitation subassembly may further include a housing to multiple cavitation-inducing features. In another implementation of the present arrangements, the multi-stage cavitation subassembly further includes one or more ultrasonic drivers disposed on and/or within the multi-stage cavitation subassembly and/or the stationary housing to facilitate acoustic cavitation within the fluid.

In another aspect, the present arrangements provide a fluid treatment system. The fluid treatment system comprises: (i) a multi-stage cavitation subassembly that further comprises: (a) a first cavitation-inducing feature for cavitating a fluid; (b) a second cavitation-inducing feature that is located downstream from the first cavitation-inducing feature and is designed to cavitate the fluid after the fluid has undergone cavitation in the first cavitation-inducing feature; and (c) a velocity-imparting component that, in a state of motion and when in contact with the fluid, imparts the fluid with sufficient velocity after the fluid has undergone cavitation in the first cavitation source so that the fluid may traverse from the first cavitation-inducing feature to the second cavitation-inducing feature; (ii) a pump that introduces the fluid inside the multi-stage cavitation subassembly; and (iii) a pressure controller that controls the fluid pressure inside the multi-stage cavitation subassembly.

In one embodiment of the present arrangements, the fluid treatment system further includes a fluid inlet and a fluid outlet, each of which is coupled to the multi-stage cavitation subassembly, and wherein the fluid inlet receives fluid inside the multi-stage cavitation subassembly to undergo treatment and the fluid outlet removes fluid after treatment inside the multi-stage cavitation subassembly.

In yet another aspect, the present teachings provide a method treating a fluid. The fluid treatment method includes: (i) pumping the fluid into a multi-stage cavitation subassembly; (ii) cavitating the fluid at a first cavitation-inducing feature inside the multi-stage cavitation subassembly to form a cavitated fluid; (iii) imparting sufficient velocity to the cavitated fluid such that the cavitated fluid traverses from the first cavitation-inducing feature to a second cavitation-inducing feature; and (iv) cavitating the cavitated fluid in the second cavitation-inducing feature to form a further cavitated fluid.

In the above-mentioned treatment method, the steps of cavitating the fluid and cavitating the further cavitated fluid may include effecting hydrodynamic cavitation on the fluid and on the cavitated fluid, respectively. The step of imparting may include putting in motion or rotating a velocity-imparting component that propels the fluid from the first cavitation-inducing feature to the second cavitation-inducing feature when the velocity-imparting component contacts the fluid.

In one embodiment of the present teachings, the above-mentioned fluid treatment method further includes removing solids from the fluid, before pumping the fluid into the multi-stage cavitation subassembly to effect cavitation in the first cavitation-inducing feature and in the second cavitation-inducing feature. However, in other embodiments of the present teachings, the fluid treatment method further includes adding solids to the fluid before pumping the fluid into the multi-stage cavitation subassembly to effect cavitation in the first cavitation-inducing feature and in the second cavitation-inducing feature.

In certain embodiments of the present teachings, the fluid treatment method further comprising adding solids, such as an absorbent to remove and/or dissolve compounds in the fluid. The adsorbent may be a material chosen from a group comprising carbon, clay, soil, bituminous coal, montmorillonite, chitosan, fly ash, alumina, bentonite, zeolite, β-cyclodextrin, dead mushrooms, silica gel, diatomaceous earth, ion exchange resins, SP206, and polyethylene.

In another embodiment of the present teachings, the fluid treatment method further comprises acoustically cavitating the fluid with one or more ultrasonic drivers coupled to the multi-stage cavitation subassembly. These drivers induce acoustic cavitation in the fluid within the multi-stage cavitation subassembly. In yet another embodiment of the present teachings, the fluid treatment method further comprises acoustically cavitating the fluid with one more ultrasonic drivers contacting the fluid within the multi-stage cavitation subassembly.

The construction and method of operation of the invention, however, together with additional objects and advantages thereof, will be best understood from the following descriptions of specific embodiments when read in connection with the accompanying figures.

DETAILED DESCRIPTION OF THE PREFERRED EMBODIMENTS

In the following description, numerous specific details are set forth in order to provide a thorough understanding of the present arrangements and teachings. It will be apparent, however, to one skilled in the art that the present arrangements and teachings may be practiced without limitation to some or all of these specific details. In other instances, well-known process steps have not been described in detail in order to not unnecessarily obscure the primary features of the present arrangements and teachings.

One embodiment of the present arrangements includes cavitation systems that produce enhanced cavitation by increasing the amount of active cavitation in a given fluid flow due to hydrodynamic conditions in the liquid. Hydrodynamic conditions in the liquid cause the pressure of the flowing liquid to decrease below vapor pressure, causing formation of gas or vapor bubbles. Gas or vapor bubble formations are followed by an increase in pressure, causing the bubbles to collapse, immediately releasing high temperatures and pressures that were formed inside the collapsing bubbles.

The present invention recognizes that release of high temperatures and pressures may be used for fluid treatment (e.g., water remediation). To this end, one preferred embodiment of the present arrangements provides a fluid treatment system that includes a conveying means (e.g., a pump), a cavitation apparatus and a pressure controller. Conveying means facilitates fluid flow through the cavitation apparatus. The cavitation apparatus, discussed below in greater detail, is preferably a multi-stage cavitation subassembly, which effects cavitation (e.g., hydrodynamic and/or acoustic) in more than one stage as the fluid flows through the multi-stage cavitation subassembly. The pressure controller controls the pressure of the fluid flowing inside the multi-stage cavitation subassembly. The fluid is, preferably, any liquid or a liquid containing any one of—a percentage of dissolved or suspended solids, dissolved gases, and a mixture of different liquids (which may be aqueous or organic in nature).

Figure 1:
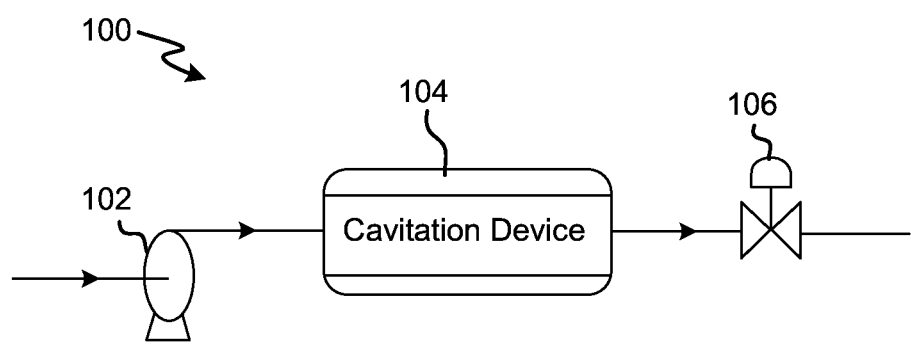
FIG. 1 shows a schematic of a fluid treatment system, according to one embodiment of the present arrangements, for high throughput fluid treatment using cavitation.

FIG. 1 shows a fluid treatment system 100, according to one embodiment of the present arrangements, for treatment of a flowing fluid stream. A fluid stream is introduced, using a pump 102, inside a cavitation apparatus 104, where the fluid undergoes cavitation, preferably multiple times. The fluid pressure inside cavitation apparatus 104 is controlled using a pressure controller 106. Preferably, cavitation apparatus 104 may be employed in various applications that are carried out at a pressure ranging from between about 15 psi and about 1500 psi. Representative applications of fluid treatment system 100 of FIG. 1 include, but are not limited to, fracking water treatment, wastewater disinfection, and sludge digestion.

In accordance with a preferred embodiment of the present arrangements, a multi-stage cavitation subassembly includes a first cavitation-inducing feature, a second cavitation-inducing feature and a velocity-imparting component. The first cavitation-inducing feature is designed to cavitate a fluid. The second cavitation-inducing feature is located downstream from the first cavitation-inducing feature and is designed to further cavitate the fluid after the fluid has undergone cavitation in the first cavitation-inducing feature. The velocity-imparting component (e.g., a pump, an impeller or a vane), in a state of motion and when in contact with the fluid, imparts the fluid with sufficient velocity after the fluid has undergone cavitation in the first cavitation-inducing feature such that the fluid may traverse from the first cavitation-inducing feature to the second cavitation-inducing feature. In this manner, the velocity-imparting component facilitates fluid flow from one cavitation-inducing feature to the next cavitation-inducing feature, allowing the fluid to undergo cavitation multiple times or at multiple stages. The first and the second cavitation-inducing features may be in the shape of venturi flow paths and these cavitation-inducing features may be fabricated on a single vane or different vanes. In other aspects of the present arrangements, cavitation-inducing features are apertures defined in various plates. In still other aspects of the present arrangements, cavitation-inducing features are venturi-shaped slots in a modified rotor-stator design.

Figure 2:
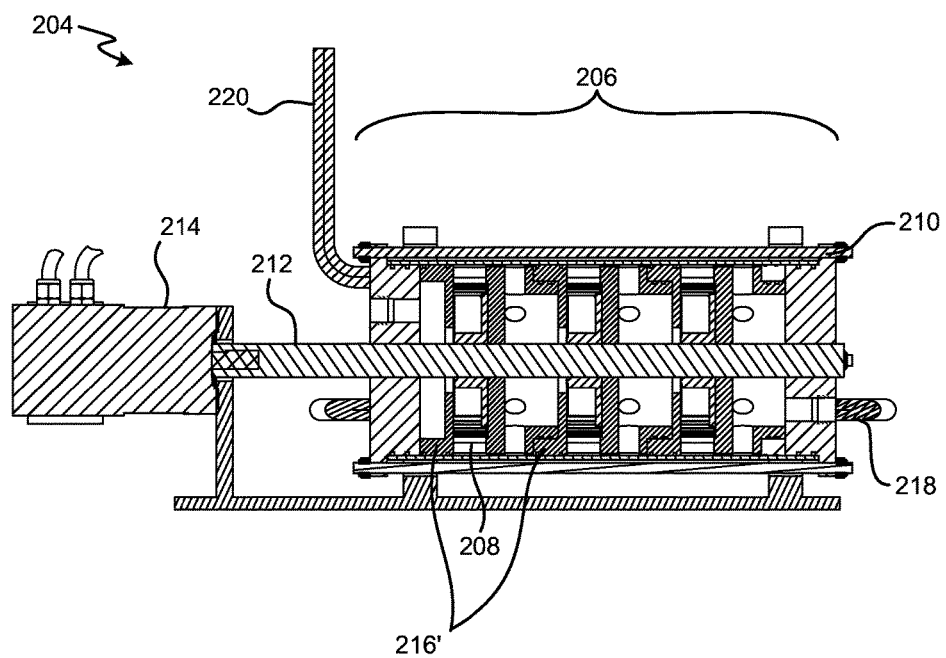
FIG. 2 shows a side-sectional view of a cavitation apparatus, according to one embodiment of the present arrangements and that may be used in the fluid treatment system of FIG. 1.

FIG. 2 shows a cavitation apparatus 204, according to one embodiment of the present arrangements, including venturi-shaped slots fabricated in a modified rotor-stator design. Cavitation apparatus 204 includes a multi-stage cavitation subassembly 206 having one or more cavitation units 208, each of which incorporates a modified stator (shown in great detail in FIG. 3, FIGS. 4A-4C) of the present teachings.

In addition to the multi-stage cavitation subassembly 206, cavitation apparatus 204 includes a fluid inlet 218, a fluid outlet 220, a shaft 212, a housing 210 including blocking plates 216. These components are designed to facilitate effective cavitation of a fluid undergoing treatment. As the fluid traverses from fluid inlet 218, through various components inside multi-stage cavitation subassembly 206 including the various cavitation units 208, and to fluid outlet 220, shaft 212 rotates to facilitate cavitation as explained below. A motor 214, preferably a three-phase variable frequency drive motor, is attached to and operates to rotate shaft 212. Blocking plates 216, positioned between each cavitation unit 208, prevent the fluid flow from bypassing each cavitation unit 208 and force fluid flow into each cavitation unit 208. As a result, motor 214 and blocking plates 216 facilitate fluid flow through the various cavitation units 208 inside multi-stage cavitation subassembly 206. The present teachings also recognize that blocking plates 216 effectively serve as flow-guiding features as it guides fluid flow to the next cavitation unit. The structure inside each cavitation unit 208 is discussed below.

Figure 3:
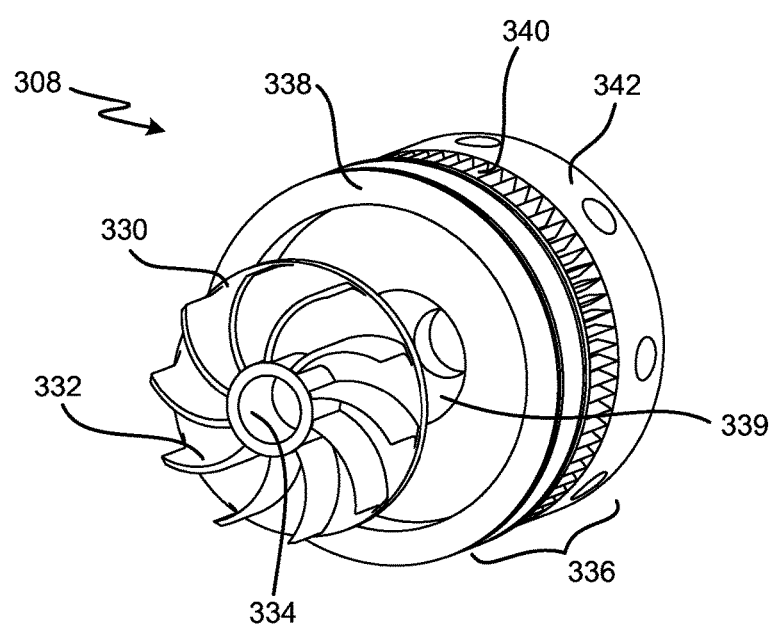
FIG. 3 shows a perspective view of a cavitation unit, according to one embodiment of the present arrangements and that may be incorporated into the cavitation apparatus of FIG. 2.

FIG. 3 shows a cavitation unit 308, according to one embodiment of the present arrangements and that is substantially similar to cavitation unit 208 of FIG. 2. Cavitation unit 308 includes a rotating impeller 330 and a stationary stator 336. Rotating impeller 330 has defined therein an aperture 334 that couples to a rotating shaft (e.g., shaft 212 of FIG. 2). As the shaft rotates, so does impeller 330 and its corresponding vanes (which are either part of or fitted onto impeller 330). Rotating impeller 330, in an assembled state, is disposed behind a front plate 338. In this configuration, fluid introduced at a fluid inlet (e.g., fluid inlet 218 of FIG. 2) flows into a front plate aperture 339 of FIG. 3 and may then be directed through an annular region of front plate 338 to impinge upon one or more rotating vanes 332. The rotational action of vanes 332 forces fluid flow in a radial direction towards the housing (e.g., housing 210). According to the present teachings, fluid is thrown out in the radial direction at a relatively higher energy and at a relatively higher speed due to the centrifugal force acting on the fluid and resulting from the rotational action of vanes 332.

While wishing to not be bound by theory, the present teaching recognize the centrifugal force acting on the fluid stream is given by $(m*v^2/r)$ or $m*r*\omega^2$ where "m" is the mass of the fluid, "v" is the linear velocity, "$\omega$" is the angular speed and "r" is circular radius (i.e., the distance from a center of impeller to an inner surface of a housing). Velocity, v, is known by an expression, $V=(2\pi*r*n/60)$, where "n" is speed of rotation in RPM (revolutions per minute) and "r" is the circular radius as described above. The present teachings believe that the energy supplied by the rotating vanes to the fluid is proportional to its rotational speed, diameter, shape and geometry. According to this theory, the centrifugal force acting on the fluid is inversely proportional to a distance the fluid has traversed from a center of impeller 330, and hence the centrifugal force increases as the fluid moves away from the center and towards the periphery.

As soon as the fluid leaves vanes 332 with high energy, it enters one or more venturi-shaped slots 340 located around a periphery of rotating vanes 332. One or more venturi-shaped slots 340, in some embodiments of the present arrangements, may be thought of as a converging section followed by a minimum cross sectional area section (called "throat") followed by a diverging section. The converging geometry in one or more venturi-shaped slots 340 accelerates the fluid flow, but decreases the fluid pressure as the fluid stream travels through the converging section. It is believed that the fluid achieves a maximum velocity when it reaches the throat section of the geometry and correspondingly the pressure of the fluid gets to its minimum as dictated by the conservation of energy equation and by Bernoulli's' principle. If the pressure goes below its vapor pressure, then the fluid starts to cavitate and cavitation bubbles are formed. These cavitation bubbles grow further downstream from the throat. As the fluid passes through the diverging section of the geometry, fluid flow starts decelerating (i.e., fluid velocity decreases as it travels through the diverging section) and the pressure of the fluid recovers (increases) which causes the cavitation bubbles to suddenly collapse. This sudden collapse of the bubbles releases extreme localized temperatures and pressures trapped inside the microscopic bubbles. The effect of high, localized temperatures and high, localized pressures is useful in treating a fluid, as explained below.

Figure 4A:
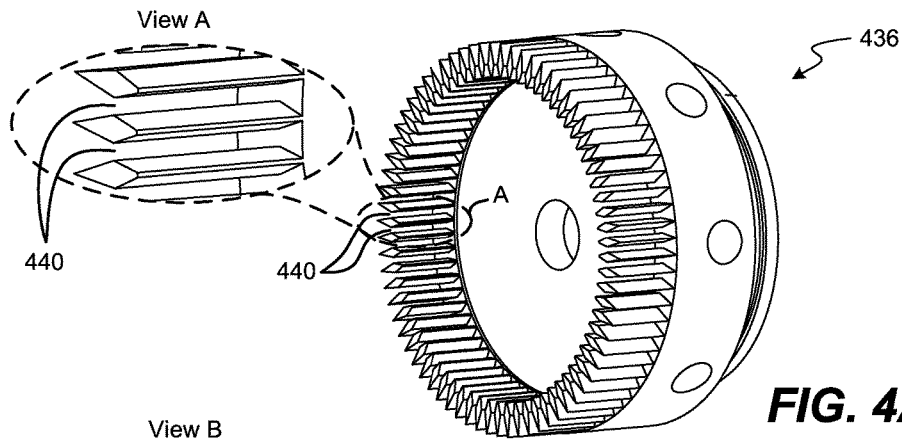
FIG. 4A shows a perspective view of a stator, according to one embodiment of the present arrangements and that may be incorporated into the cavitation unit of FIG. 3.
Figure 4B:
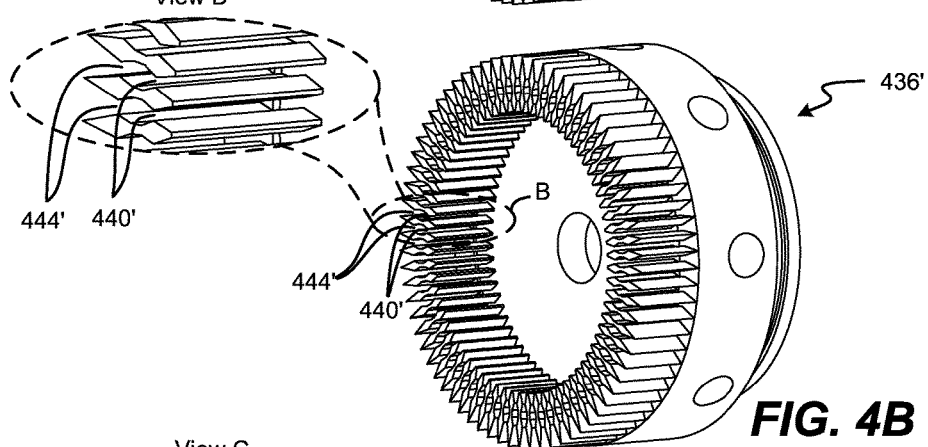
FIG. 4B shows a perspective view of another stator, according to another embodiment of the present arrangements and that may be incorporated into the cavitation unit of FIG. 3.
Figure 4C:
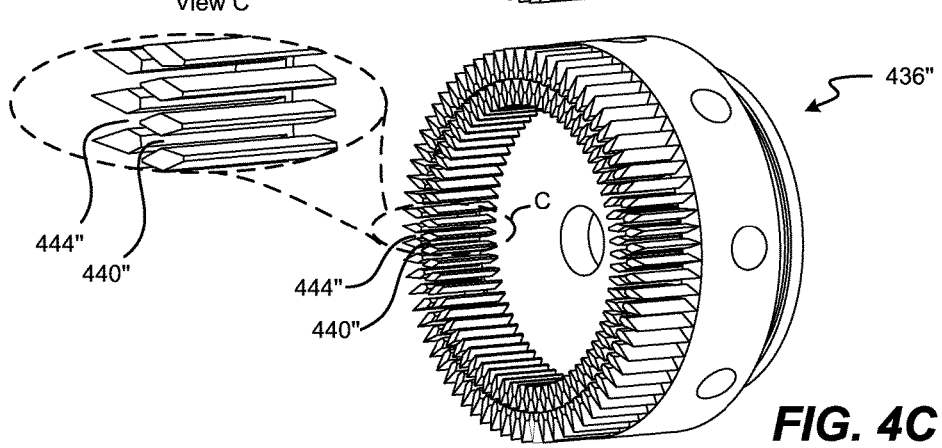
FIG. 4C shows a perspective view of yet another stator, according to yet another embodiment of the present arrangements and that may be incorporated into the cavitation unit of FIG. 3.

FIGS. 4A, 4B and 4C show perspective views of exemplar stator designs that are akin to stator 336 shown in FIG. 3 and that may be incorporated into cavitation unit 308 of FIG. 3. FIG. 4A shows a stator 436 with a single layer of one or more venturi-shaped slots 440. FIG. 4B shows another stator 436' including a first layer of one or more venturi-shaped slots 440' and a second layer of one or more venturi-shaped slots 444'. In this embodiment of the present arrangements, the first layer of one or more venturi-shaped slots 440' is aligned sequentially with the second layer of one or more venturi-shaped slots 444'. As a result, cavitated fluid is guided from exiting venturi-shaped slots 440' to an uniaxially aligned venturi-shaped slot 444'. In an assembled state of a cavitation unit (e.g., cavitation unit 308 of FIG. 3), which includes stator 436', the centrifugal force on the flowing fluid resulting from a rotating impeller propels the cavitated fluid with sufficiently high velocity from first venturi-shaped slot 440" to arrive at and undergo cavitation again in second venturi-shaped vanes 444'.

FIG. 4C shows a stationary stator 436" including a first layer of one or more venturi-shaped slots 440" is followed by a second layer of two adjacent venturi-shaped slots 444". In this design, the cavitated fluid passes through the diverging geometry of one or more venturi-shaped slots 440" of the first layer and is guided to the converging geometry of two adjacent venturi-shaped slots 444' of the second layer.

Referring back to FIG. 3, as the cavitated fluid exits out of first ones of venturi-shaped slots 340, impeller 330 continues to force the fluid through a vacant region between stationary stator 336 and a housing (shown in FIG. 2 and denoted by reference numeral 210) surrounding cavitation unit 308. The vacant region provides a fluid flow path to move from one or more venturi-shaped slots 340 to a perforated spacer 342, having defined therein one or more apertures to allow fluid flow therethrough. In certain embodiments of the present arrangements that implement multiple cavitation units, fluid flows from perforated spacer 342 to another cavitation unit 308 where it undergoes another step of cavitation. As explained below, number of cavitation units 308 being used inside a present fluid treatment system depends on the amount of cavitation needed based upon the application that is being implemented.

The present teachings identify other parameters of interest in terms of the stator design for different applications of the present fluid treatment systems. By way of example, the number and geometry of slots in each layer, the number of layers, the length of the converging section, the angle of convergence, the size of the throat section in terms of length and diameter, the length of the diverging section, the angle of divergence and also the distance between different slot layers and the number of layers, may be adjusted and optimized to individual applications of the cavitation unit (e.g., fracking water treatment, wastewater disinfection or sludge digestion).

Figure 5:
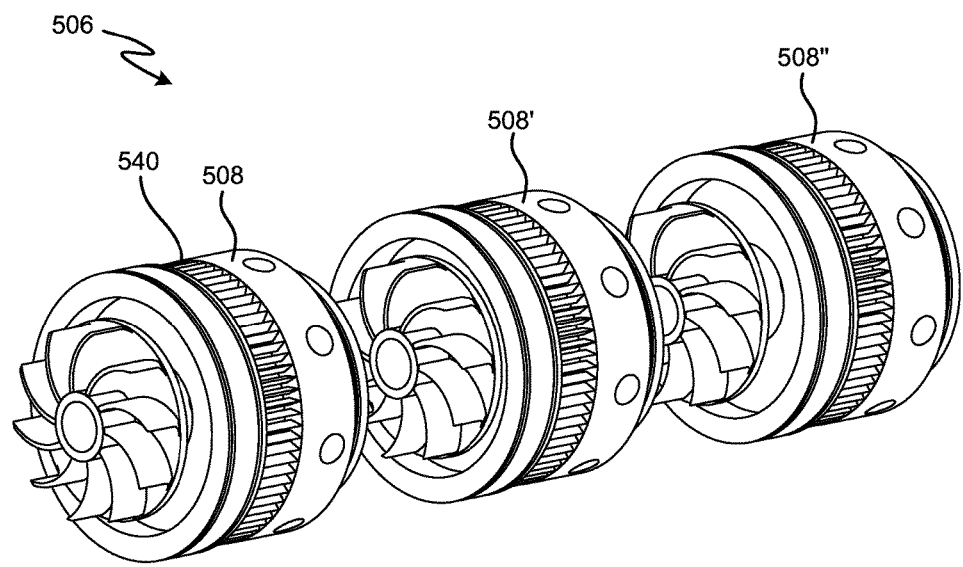
FIG. 5 is an exploded perspective view of a multi-stage cavitation subassembly, according to one embodiment of the present arrangements and that may be incorporated into the cavitation apparatus of FIG. 2.

FIG. 5 shows an exploded view of a multi-stage cavitation subassembly 506, according to one embodiment of the present arrangements and that includes multiple cavitation units 508, 508' and 508". Each cavitation unit in subassembly 506 is substantially similar to cavitation unit 208 of FIG. 2. As a fluid stream passes through each cavitation unit 508, 508' or 508", the fluid undergoes cavitation at that cavitation unit. The modular design of cavitation units in subassembly 506 allows use of additional or less cavitation units. The number of cavitation units required to cavitate a fluid may depend on, among other things, the type of fluid that is treated. For example, some applications such as such as milk pasteurization or ballast water treatment may need fewer cavitation units whereas other applications such as sludge pretreatment or fracking water treatment may need more of these cavitation units to achieve the desired degree of treatment of the fluid.

In one embodiment of the present arrangements, each of cavitation units 508, 508' and 508" may have identical venturi-shaped slots 540. By way of example, each cavitation unit may include a single layer of venturi-shaped slots (e.g., venturi-shaped slots 440 of FIG. 4A).

However, in other embodiments of the present arrangements, cavitation unit 508, 508' and 508" may include different types of venturi-shaped slot configurations. By way of example, cavitation unit 508 may include a single layer of venturi-shaped slots and cavitation units 508' and 508" may have two layers of venturi-shaped slots (e.g., venturi-shaped slots 444' of FIG. 4B).

Figure 6:
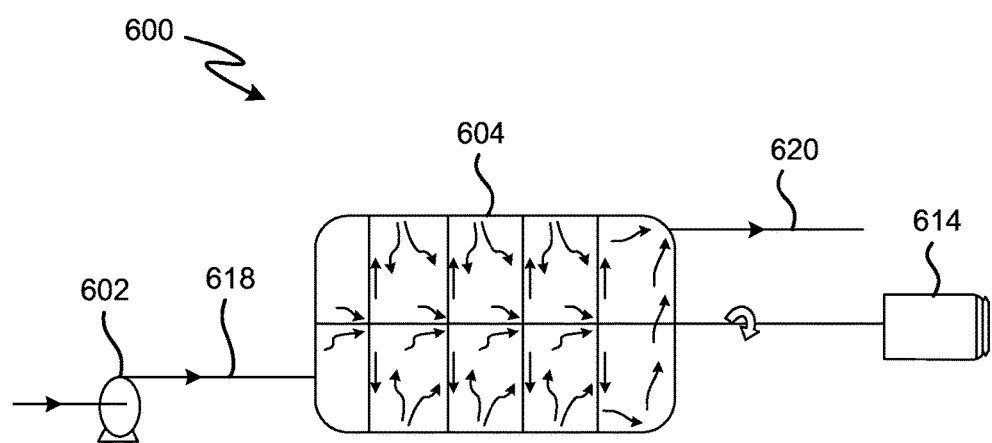
FIG. 6 is a schematic of a fluid treatment system of FIG. 1 and that has defined therein fluid flow paths, according to one embodiment of the present arrangements and that are disposed within the cavitation apparatus of FIG. 2.

FIG. 6 shows a fluid treatment system 600, according to one embodiment of the present invention, showing different fluid flow paths. A pump 602 drives fluid flow to cavitation apparatus 604 containing one or more cavitation units (e.g., cavitation units 508, 508' and 508" of FIG. 5). Fluid is pumped into cavitation apparatus 604 through an inlet 618, and treated fluid is pumped out of cavitation apparatus 604 though outlet 620. One or more impellers (e.g., impeller 330 of FIG. 3) are coupled to a shaft, which is driven by an electric motor 614 during fluid flow. In an operative state of the shaft, one more of the impellers rotate and draw the fluid through a central aperture of a front plate (e.g., front plate 338 of FIG. 3) in each cavitation unit. As the entering fluid strikes one or more of the impellers, the fluid is pushed radially outward and towards the inner surface of the housing (e.g., housing 210 of FIG. 2). Along this flow path, the fluid is driven through venturi-shaped slots of a stator (e.g., venturi-shaped slots 340 of stationary stator 336 of FIG. 3), which is preferably stationary, and undergoes hydrodynamic cavitation as discussed above.

In certain embodiments of the present arrangements where two layers of venturi-shaped slots are employed (e.g., FIGS. 4B and 4C), the cavitated fluid passes through a second venturi-shaped slot and is cavitated a second time. Regardless of whether the fluid is cavitated once or more than once, the cavitated fluid is directed through a vacant region, as discussed above, to perforations on the stator that allow fluid flow to interact with another cavitation unit.

An impeller in the second cavitation unit, like in the first cavitation unit, forces the fluid outward and towards the venturi-shaped slots of the second stator to further cavitate the fluid. This cavitation process continues in this manner until the fluid passes through the last cavitation unit and exits cavitation apparatus 604 through outlet 620.

Figure 7:
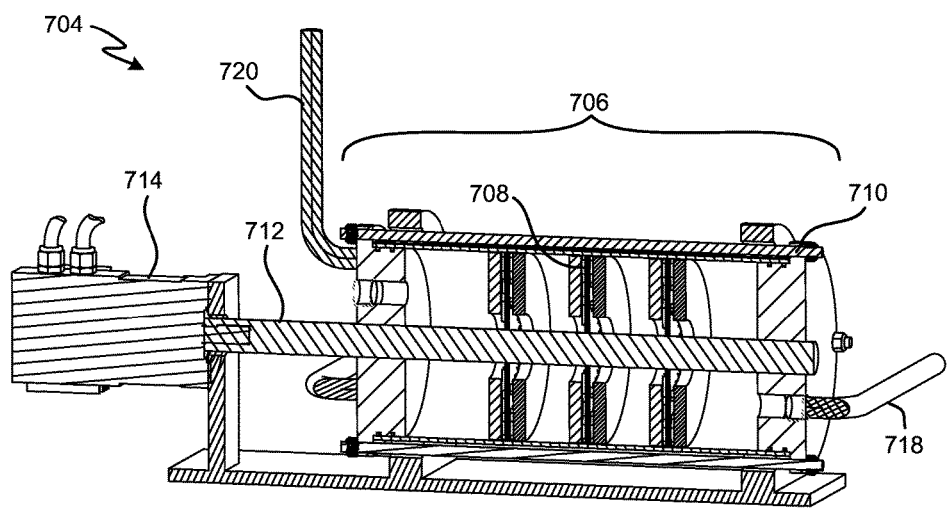
FIG. 7 shows a side-sectional view of another cavitation apparatus, according to another embodiment of the present arrangements, including multiple cavitation units, and wherein the cavitation apparatus may be used in the fluid treatment system of FIG. 1.

FIG. 7 shows another cavitation apparatus 704, according to another embodiment of the present arrangements, and that includes certain components used to facilitate cavitation of a fluid when a fluid treatment system (e.g., fluid treatment system 102 of FIG. 1) is in use. Cavitation apparatus 704 includes a housing 710, a shaft 712, a motor 714, a fluid inlet 718 and a fluid outlet 720, all of which are substantially similar to housing 210, shaft 212, motor 214, fluid inlet 218 and fluid outlet 220 of FIG. 2. Fluid treatment system 704, however, incorporates a multi-stage cavitation subassembly 706 with one or more cavitation units 708 that may be different than one or more cavitation units 208 of FIG. 2. Cavitation units that may be used in cavitation apparatus 704 are described below in connection with FIGS. 8A, 8B, 9A, 9B, 10A, 10B and 10C.

Figure 8A:
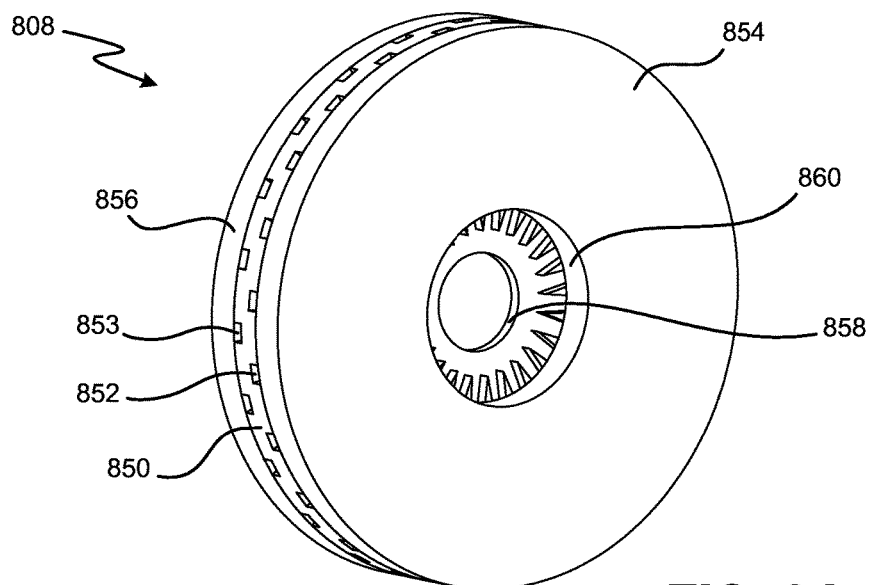
FIG. 8A shows a perspective view of a cavitation unit, according to one embodiment of the present arrangements, including a vane plate sandwiched between a front plate and back plate, and wherein the cavitation unit may be incorporated in the cavitation apparatus of FIG. 7.

FIG. 8A is a perspective view of a cavitation unit 808, according on one embodiment of the present arrangements and that is substantially similar to cavitation unit 708 of FIG. 7. Cavitation unit 808 includes a vane plate 850, having a front surface and a back surface. Each of the front surface and the back surface has fabricated thereon one or more venturi vanes 852 and 853. Vane plate 850 is sandwiched between a front plate 854 and a back plate 856.

At or near its center, vane plate 850 has defined therein an aperture 858, which is configured to receive a shaft. In an operative state of the shaft, front plate 854 and a back plate 856, which couple to vane plate 850, also rotate when vane plate 850 rotates. Each of front plate 854 and back plate 856 has defined therein an aperture 860 that is larger than vane plate aperture 858. A shaft (e.g., shaft 212 of FIG. 2) extends through apertures 858 and 860. A space created between the shaft and aperture 860 allows fluid to flow into venturi vanes 852 of vane plate 850.

In an assembled configuration of front plate 854, vane plate 850 and back plate 856 and when the respective apertures of these plates are aligned, as shown in FIG. 8A, fluid flow is introduced through aperture 860 of front plate 854 into one or more venturi vanes 852 that are facing a front surface of vane plate 850. Similarly, on a back surface of vane plate 850, a fluid flow is introduced through aperture 860 of back plate 856 into one or more venturi vanes 853. As a result, surfaces of the front and the back plate, which contact venturi vanes 852 and 853, serve to define a fluid flow path inside venturi vanes 852 and 853 such that a fluid stream is forced to flow through both surfaces of vane plate 850. For the fluid to flow from the end of venturi vanes 852 to aperture 860 on the back surface of vane plate 850, it is preferably to have a sufficient clearance between vane plate 850 and the housing. By way of example, a clearance of about 0.01 inch to about 1 inch between an inside surface of the housing and cavitation unit 808 facilitates fluid flow as the fluid exits the venturi vanes 852 to travel to aperture 860.

Figure 8B:
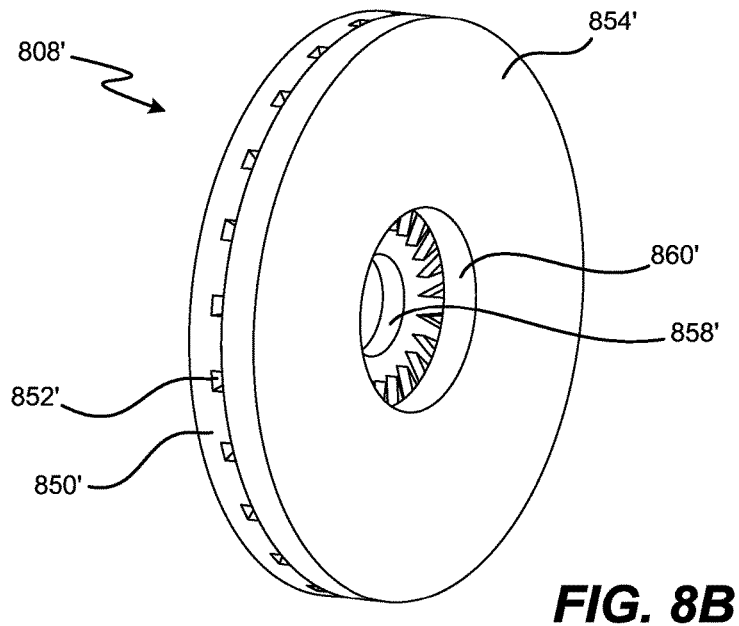
FIG. 8B shows a perspective view of another cavitation unit, according to another embodiment of the present arrangements, including a vane plate, which is disposed adjacent to a front plate in the absence of a back plate, and wherein the cavitation unit may be incorporated in the cavitation apparatus of FIG. 7.

FIG. 8B shows another cavitation unit 808', according to another embodiment of the present arrangements and that includes a vane plate 850' having only one surface with one or more venturi vanes 852'. In the embodiment shown in FIG. 8B, vane plate 850' has a front surface with one or more venturi vanes 852', while the back surface does not. When vane plate 850' is secured to front plate 856', a fluid flow path is defined in venturi vanes 852' starting from a center of vane plate 850' to its periphery. The fluid undergoes cavitation as it flows through venturi vanes 852'. After exiting venturi vanes 852', the cavitated fluid flows to another cavitation unit within the same cavitation apparatus or to an outlet of the cavitation apparatus. In other embodiments of the present arrangements, one or more venturi vanes may be fabricated on the back surface of vane plate 850', and not fabricated on its front surface.

Figure 9A:
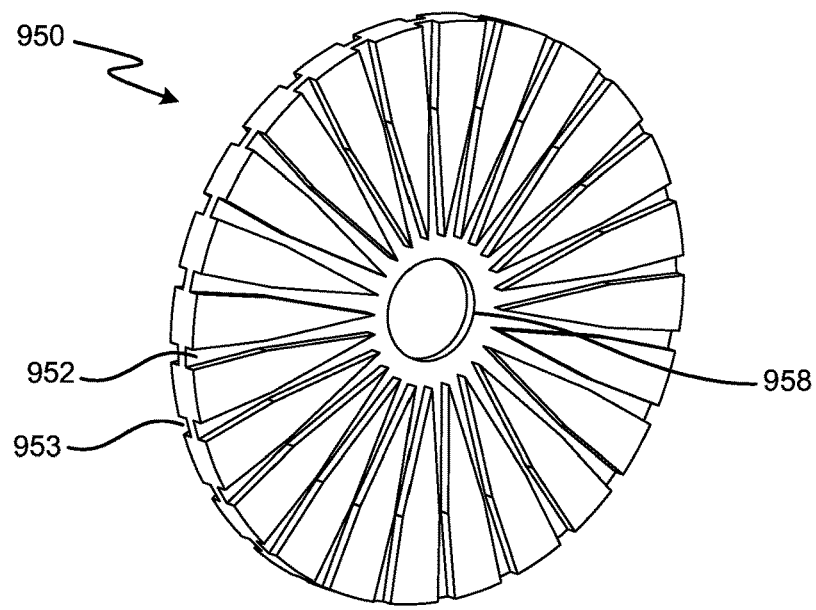
FIG. 9A shows a perspective view of a vane plate, according to one embodiment of the present arrangements, including venturi vanes on a front surface that align with the venturi vanes on a back surface, and wherein the vane plate may be incorporated in the cavitation unit of FIG. 8A or FIG. 8B.

FIG. 9A shows a vane plate 950, according to one embodiment of the present arrangements and that has venturi-shaped vanes fabricated on its front surface and on its back surface. Vane plate 950 having defined, at or near its center, an aperture 958 that is configured to receive a shaft that rotates vane plate 950 during an operative state of the ultimately assembled cavitation apparatus. Vane plate 950 also includes one or more venturi vanes 952 on its front surface and one or more venturi vanes 953 on its back surface. According to the embodiment of FIG. 9A, venturi vanes 952 align with venturi vanes 953 along the circumference of vane plate 950.

Figure 9B:
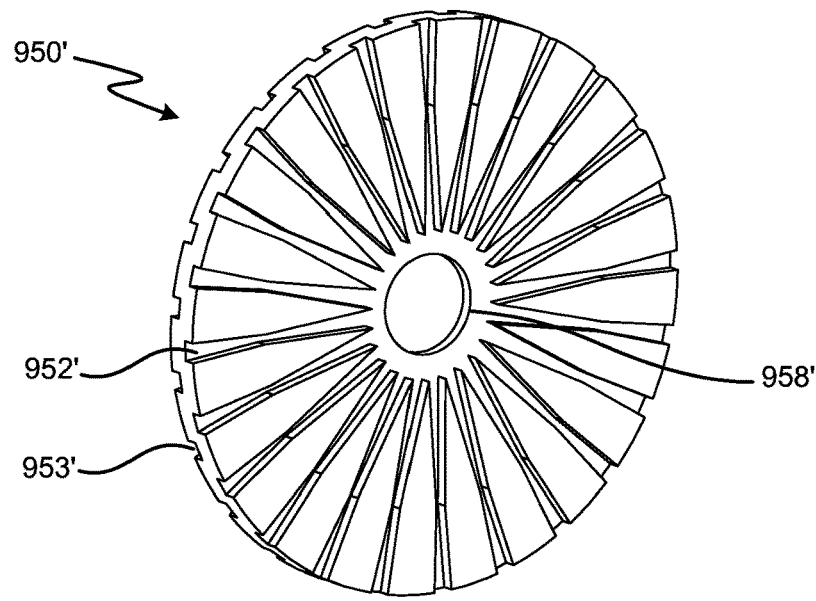
FIG. 9B shows a perspective view of another vane plate, according to another embodiment of the present arrangements, including venturi vanes on a front surface that do not align with venturi vanes on a back surface, and wherein the vane plate may be incorporated in the cavitation unit of FIG. 8A or FIG. 8B.

FIG. 9B shows another vane plate 950', according to another embodiment of the present arrangements and that has venturi-shaped vanes on a front surface and on a back surface. Vane plate 950', aperture 958', and venturi vanes 952' and 953' are substantially similar to their counterparts, i.e., vane plate 950, aperture 958, and venturi vanes 952 and 953 of FIG. 9A. According to the embodiment of FIG. 9B, however, venturi vanes 952' do not align with venturi vanes 953', but rather are alternately positioned relative to each other and along the circumference of vane plate 950'.

Figure 10A:
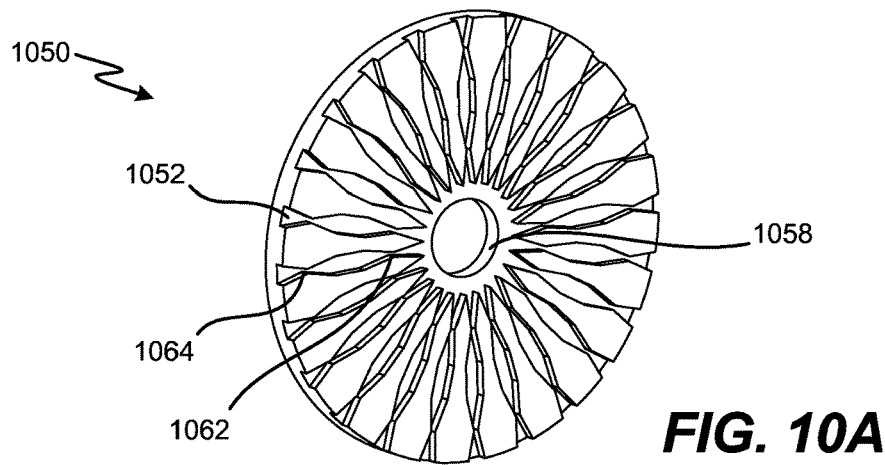
FIG. 10A shows a perspective view of a multi-constriction vane plate, according to one embodiment of the present arrangements, including, on one surface, venturi vanes, each of which has more than one venturi flow paths, and wherein the multi-constriction vane plate may be incorporated in the cavitation unit of FIG. 8A or FIG. 8B.
Figure 10B:
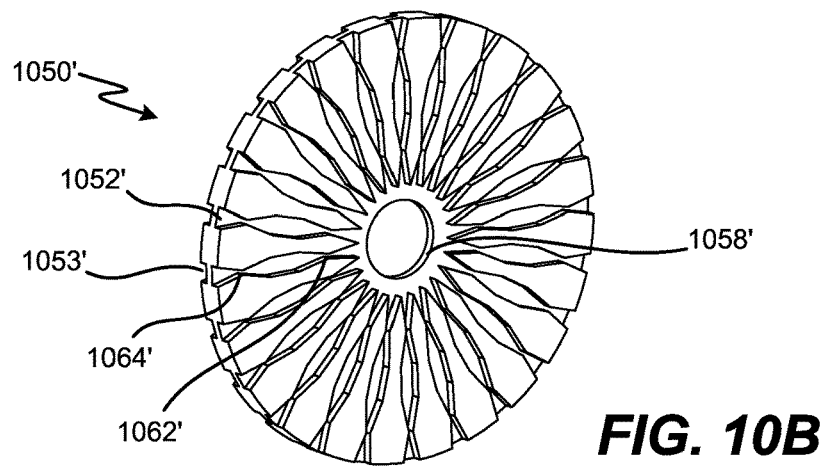
FIG. 10B shows a perspective view of another multi-constriction vane plate, according to another embodiment of the present arrangements, including venturi vanes on a front surface that align with the venturi vanes on a back surface, and each venturi vane has more than one venturi flow paths, and wherein the multi-constriction vane plate may be incorporated in the cavitation unit of FIG. 8A or FIG. 8B.
Figure 10C:
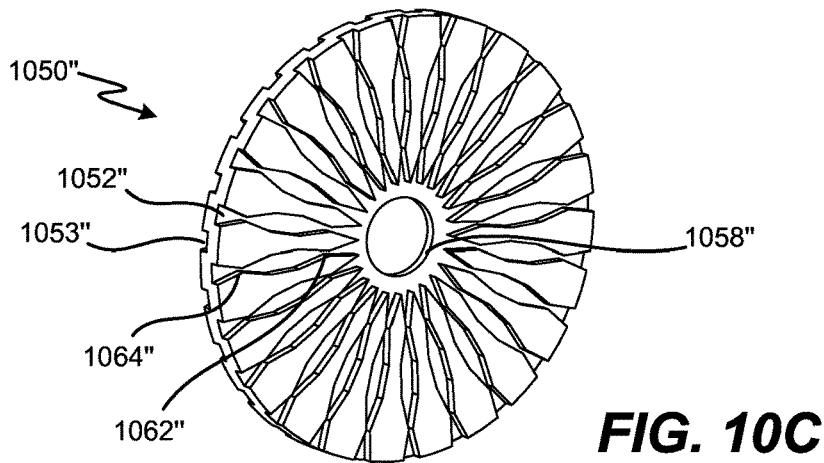
FIG. 10C shows a perspective view of yet another multi-constriction vane plate, according to another embodiment of the present arrangements, including venturi vanes on a front surface that do not align with venturi vanes on a back surface, and each venturi vane has more than one venturi flow paths, and wherein the multi-constriction vane plate may be incorporated in the cavitation unit of FIG. 8A or FIG. 8B.

Each of FIGS. 10A, 10B and 10C show an alternate embodiment of a vane plate. FIG. 10A shows a vane plate 1050 that has fabricated on its surface one or more vanes 1052 including two venturis 1062 and 1064. Other than having two venturis (instead of a single venturi), vane plate 1050 is substantially similar to vane plate 850' of FIG. 8B.

FIG. 10B shows another vane plate 1050' that includes one or more venturi vanes 1052' fabricated on its front surface that align with one or more venturi vanes 1053' fabricated on its back surface and are similar to vane plate 950' described in FIG. 9B. Vane pate 1050' of FIG. 10B is also substantially similar to vane plate 950' of FIG. 9B in other respects, except each of venturi vanes 1052' and 1053' of vane plate 1050' include a first venturi 1062' and a second venturi 1064'.

FIG. 10C shows yet another vane having fabricated on its front and back surfaces one or more venturi vanes 1052" and 1053", each of which includes a first venturi 1062" and a second venturi 1064". Venturi vanes 1052" and 1053" are positioned alternately relative to each other and along the circumference of the vane plate, and do not align with each other. In this respect venturi vanes 1052" and 1053" are substantially similar to venturi vanes 952' and 953' of FIG. 9B.

Each embodiment shown in FIGS. 10A, 10B and 10C includes venturi-shaped vanes having multiple cavitation-inducing features to cavitate a fluid. Preferably, the venturi-shaped vane has a first cavitation-inducing feature (e.g., a first venturi) for cavitating the fluid for a first time as the fluid travels along a vane and then a second time at a second cavitation-inducing feature (e.g., a second venturi). In this embodiment, the second cavitation-inducing feature is positioned downstream from the first cavitation-inducing feature. It is believed that in this configuration, cavitation is stronger at the second cavitation-inducing feature relative to the first cavitation-inducing feature because of the relatively higher fluid velocity resulting at the second cavitation-inducing feature, which is farther than the first cavitation-inducing feature from the center of the vane plate.

Further, vane plate embodiments shown in FIGS. 10A, 10B and 10C have defined therein apertures 1058, 1058' and 1058" that are substantially similar to those shown in vane plates of FIGS. 8A, 8B, 9A and 9B. These apertures may be used to draw the fluid into the venturi vanes fabricated on the vane plates so that cavitation may commence.

Though FIGS. 10A, 10B and 10C shows each venturi vane with two venturis disposed sequentially, the present invention contemplates use of any number of venturis or cavitation structures disposed on a vane to change the quantity and/or intensity of cavitation in a fluid. Similarly, for a each venturi the length of the converging section, the angle of the converging section, the length and diameter of the minimum cross section area section, the distance between different venturi vanes in series, and the length and angle of divergence of the diverging section, may be adjusted the intensity and/or amount of cavitation in a fluid.

Figure 11:
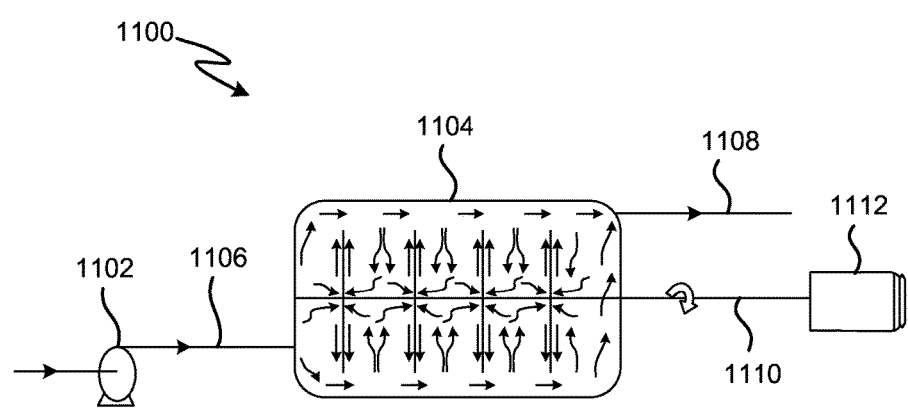
FIG. 11 is a schematic of a fluid treatment system of FIG. 1 and that has defined therein fluid flow paths, according to one embodiment of the present arrangements and that are disposed within the cavitation apparatus of FIG. 7.

FIG. 11 shows a fluid treatment system 1100, according to one preferred embodiment of the present arrangements and a fluid flow path therein. A pump 1102 introduces fluid flow into a cavitation apparatus 1104 through an inlet 1106, and the treated fluid is pumped out of cavitation apparatus 1104 though an outlet 1108. Cavitation apparatus 1104 includes one or more cavitation units (e.g., one or more cavitation units 708 of FIG. 7 and cavitation unit 808 of FIG. 8A) that are coupled to a shaft. During operation of fluid treatment system 1100, an electric motor 1112 attached to the shaft preferably rotates one more cavitation units. Under this rotation action, the fluid is drawn inside and is forced through one or more venturi-shaped vanes. Once inside the venturi vanes, the fluid is pushed radially outward and towards the surface of the housing of the cavitation apparatus. As the fluid is driven through one or more venturi-shaped vanes, at least one cavitation-inducing features cavitate the fluid. Furthermore, in certain other embodiments where the back surface of the vane plate include venturi vanes, the fluid is further cavitated depending on the number of cavitation-inducing features fabricated on the back surface of the vane plate. As a result, the fluid may undergo cavitation multiple times before the fluid exits a particular cavitation unit. After undergoing cavitation in the first cavitation unit, the fluid may flow to a second cavitation unit where the already cavitated fluid is cavitated yet again. Apertures defined in the vane plate of the second cavitation unit draw the already cavitated fluid into the venturi vanes for additional cavitation.

Figure 12:
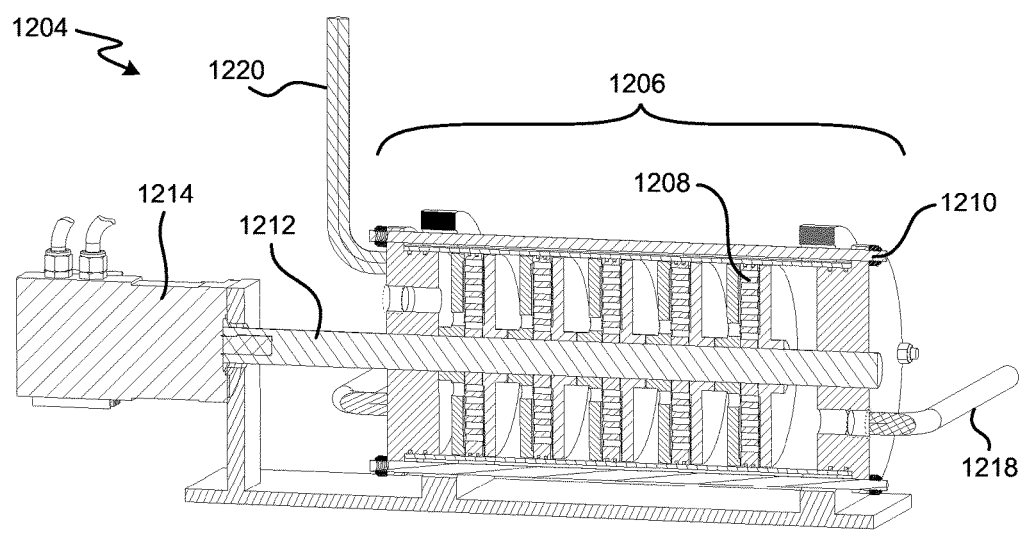
FIG. 12 shows a side-sectional view of yet another cavitation apparatus, according to yet another embodiment of the present arrangements, including multiple cavitation units, and wherein the cavitation apparatus may be used in the fluid treatment system of FIG. 1.

FIG. 12 shows yet another cavitation apparatus 1204, according to yet another embodiment of the present arrangements and that includes certain components used to facilitate cavitation of fluid when the fluid treatment system is operating. Cavitation apparatus 1204 includes housing 1210, shaft 1212 and motor 1214, fluid inlet 1218 and fluid outlet 1220, all of which are substantially similar to housing 210, shaft 212, motor 214, fluid inlet 218 and fluid outlet 220 of FIG. 2. Fluid treatment system 1204, however, preferably incorporates a multi-stage cavitation subassembly 1206 with one or more cavitation units 1208 that incorporate a stationary cavitation disc.

Figure 13:
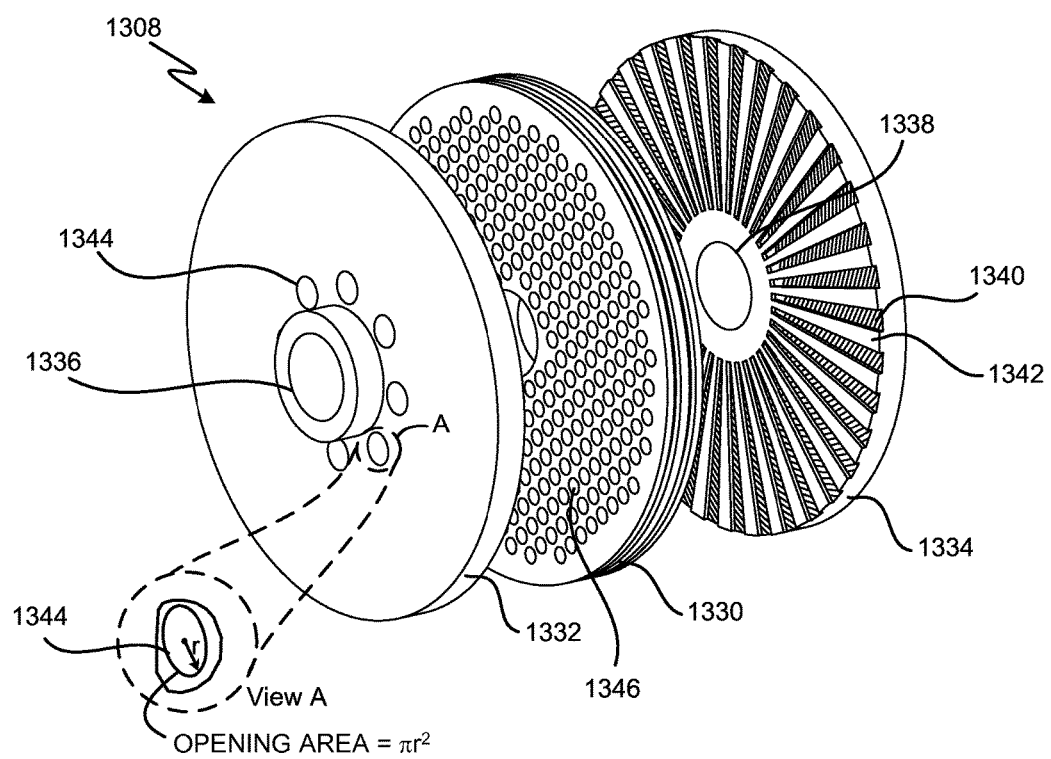
FIG. 13 shows a perspective view of a cavitation unit, according to one embodiment of the present arrangements and that includes a center disc sandwiched between a front disc and a back disc, each of which has apertures or vanes fabricated thereon to effect multi-stage cavitation.

FIG. 13 shows a cavitation unit 1308, according to one preferred embodiment of the present arrangements and that may be incorporated into cavitation apparatus 1204 of FIG. 12. In other words, cavitation unit 1308 is substantially similar to cavitation unit 1208 of FIG. 12. As shown in FIG. 13, cavitation unit 1308 may include a cavitation disc 1330 that is sandwiched between a forward disc 1332 and a rear disc 1334. Each of forward disc 1332 and rear disc 1334 has defined at or near its center region apertures 1336 and 1338, respectively. Apertures 1336 and 1338 are designed to receive a shaft (not shown to simplify illustration). In this configuration, shaft is capable of rotating both forward disc 1332 and rear disc 1334.

In another preferred embodiment of the present arrangements, rear disc 1334 is absent. By way of example, in FIG. 13 cavitation unit 1308 may include forward disc 1332 and cavitation disc 1330 but does not include rear disc 1334. In this embodiment, forward disc 1332 is capable of rotating while cavitation disc 1230, described in further detail below, remains stationary.

In the embodiment shown in FIG. 13, rear disc 1334 may also include one or more vanes 1340 disposed on its front surface. Similarly, front disc 1332 may include one or more vanes (not shown to simplify illustration) disposed on its back surface. In an exemplar assembled state of a present cavitation units, these vanes are disposed adjacent to cavitation disc 1330. In another embodiment of the present arrangements, one of forward disc 1332 and rear disc 1334 may include vanes while the other disc does not include vanes. In other words, only one of the two discs may include vanes. The present teachings recognize that certain variables, e.g., number of vanes, geometry of the vanes, distance between different vanes in series, angle of apertures, depth of apertures and diameter of aperture 1346, may be varied to change the cavitation characteristics. Cavitation characteristics may be optimized depending on the application of fluid treatment system 100 of FIG. 1.

The present arrangements also include one or more fluid receiving apertures 1344 defined at or near a center region of forward disc 1332 and/or rear disc 1342 for receiving a fluid. According to the embodiment shown in FIG. 13, one or more fluid receiving apertures 1344 extend radially from a center region of front disc 1332. As shown in "view A" of FIG. 13, one or more fluid receiving apertures 1344 define an opening area which equals $\pi r^2$, where "r" is a radius of aperture 1344. Although FIG. 13 shows a circular-shaped aperture 1344, the present arrangements are not so limited. One or more fluid receiving apertures 1344 may have any shape. Other present arrangements include apertures that have one exemplar shape chosen from a group comprising square, rectangle, hexagonal and triangle.

According to the embodiment of FIG. 13, cavitation disc 1330 may be sandwiched between forward disc 1332 and rear disc 1334. Preferably, the spacing between forward disc 1332 and cavitation disc 1330 is between about 0.025 inches and about 0.125 inches. Similarly, the spacing between rear disc 1334 and cavitation disc 1330 is preferably between about 0.025 inches and about 0.125 inches. When the present arrangements are in use, cavitation disc 1330 may remain stationary while forward disc 1332 and rear disc 1334 rotate. The present teachings contemplate any manner of securing cavitation disc 1332 to remain stationary while present arrangements are in an operative state. In one embodiment of the present teachings, cavitation disc 1330 is secured to the inner surface of the cavitation apparatus housing. Preferably, cavitation disc 1330 is mounted to the inner surface of the cavitation apparatus housing in a non-permanent manner, such as, using preloaded O-rings, sealants or epoxy to provide easy removal for maintenance and service of the inventive systems. As a result, it is possible to hold cavitation disc 1330 stationary, while fluid flows through one or more cavitation apertures 1246. Furthermore, to facilitate maintenance, cavitation disc 1330 may be easily removed.

Fluid flowing over and/or through cavitation disc 1330 may pass over and/or through one or more cavitation apertures 1346. Cavitation apertures 1346, defined in cavitation disc 1330, facilitate cavitation of the fluid. The present teachings contemplate any manner of organizing and arranging of one or more cavitation apertures 1346. According to the embodiment of FIG. 13, one or more cavitation apertures 1346 are disposed in a grid like formation on cavitation disc 1330. In another embodiment of the present arrangements, however, one or more cavitation apertures 1346 may radially extend on cavitation disc 1330. It is important to note, however, that regardless of the arrangement of one or more cavitation apertures 1246, the opening area of each aperture is preferably smaller than the opening area of one or more fluid receiving apertures 1344 on forward disc 1332. The fluid flow from a larger opening to a smaller opening creates a rapid change in pressure to induce hydrodynamic cavitation.

According to the present teachings, hydrodynamic cavitation may be achieved by pumping a fluid flow through one or more fluid receiving apertures 1344 defined in forward disc 1332 when it is rotating. Rotating forward disc 1332 forces fluid radially outward due to the rotating action of one or more vanes disposed on the backside of the forward disc 1332. One or more vanes 1340 exert a centrifugal force on the fluid. The higher the rotation speed of the forward disc 1332, the higher the centrifugal force on the fluid, which increases the velocity of the liquid. Rotating forward disc 1332 creates a vortex motion in the fluid as it passes over and/or through one or more cavitation apertures 1346 in stationary disc 1330, wherein one or more cavitation apertures 1346 being smaller than one or more fluid receiving apertures 1344 in forward disc 1332. The present teachings thus recognize, among other things, that as the fluid flows from a larger cross sectional area to a smaller cross sectional area, the speed of the fluid increases, and its pressure decreases, and the pressure head is converted to velocity head to maintain conservation of energy according to Bernoulli's principle. In such manner, a more intensified vortex cavitation of fluid is accomplished. Furthermore, rear disc 1334 and its vanes may similarly facilitate hydrodynamic cavitation. Consequently, it is possible for the present teachings to provide one or more instances of hydrodynamic cavitation inside a cavitation apparatus.

In another preferred embodiment of the present teachings, one or more cavitation apertures 1346 are blind holes instead of through holes. Fluid entering through one or more fluid receiving apertures 1344 is pushed out by centrifugal force towards the periphery of cavitation disc 1330 and creates vortex cavitation in the one or more blind holes on cavitation disc 1330.

In another embodiment of the present arrangements, cavitation unit 1308 may include additional cavitation structures to increase cavitation of a fluid. By way of example, each vane 1340 disposed on a front surface 1342 of rear disc 1334 may include one or more cavitation-inducing features for cavitating a fluid. Similarly, each vane disposed on the rear surface of forward disc 1332 may have one or more cavitation-inducing features. In one embodiment of the present arrangements, each vane 1340 and/or each vane of the forward disc 1332 may have one or more venturi-shaped features or structures to cavitate the fluid as it is forced through each vane. In this manner, the cavitation unit 1308 has multiple methods of inducing cavitation in a fluid.

Figure 14:
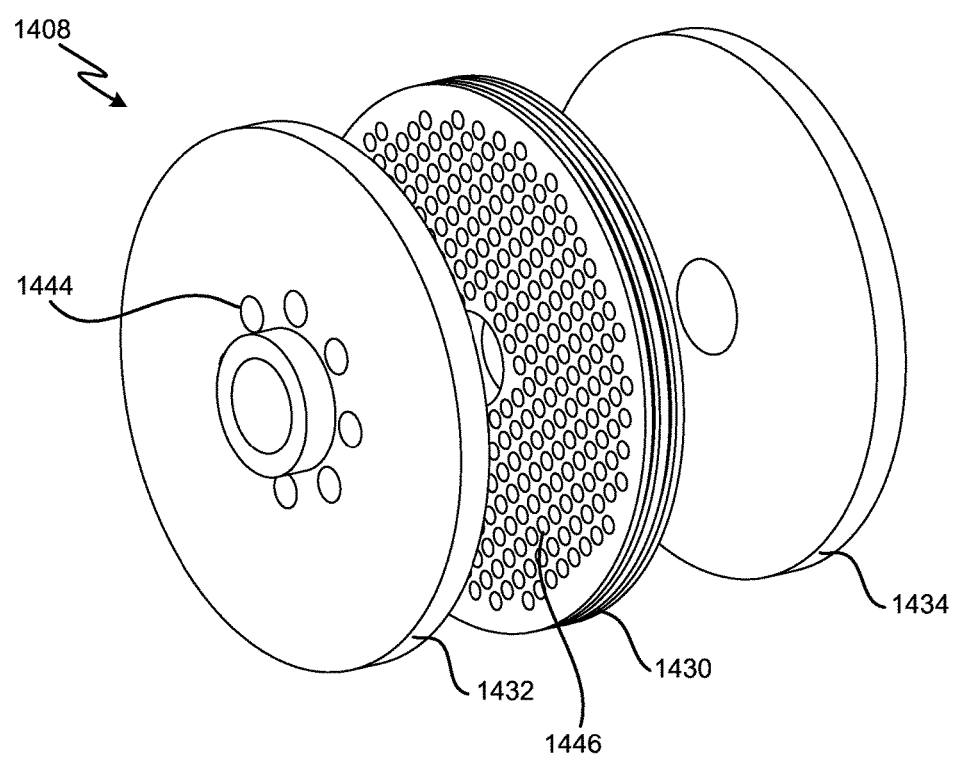
FIG. 14 shows a perspective view of a cavitation unit, according to one embodiment of the present arrangements and that includes a center disc sandwiched between a front disc and a back disc, each of which as defined therein apertures to effect cavitation.

FIG. 14 shows a cavitation unit 1408, according to another embodiment of the present arrangements and that may be incorporated in the multi-stage cavitation subassembly 1206 shown in FIG. 12. Cavitation unit 1408 has a cavitation disc 1430 sandwiched between forward disc 1432 and a rear disc 1434. Cavitation disc 1430 is substantially similar to its counterpart 1330 in FIG. 13. According to the embodiment in FIG. 14, however, forward disc 1432 and rear disc 1434 do not include vanes as found in their counterparts forward disc 1332 and rear disc 1334 of FIG. 13. In this embodiment of the present arrangements, the fluid flow from a larger opening (e.g., fluid receiving apertures 1444) to a smaller opening (e.g., cavitation apertures 1446) creates a rapid change in pressure to induce hydrodynamic cavitation. In the absence of such vanes, the present teachings provide a cavitation system design that treats fluid without suffering from significant pressure head loss.

Figure 15:
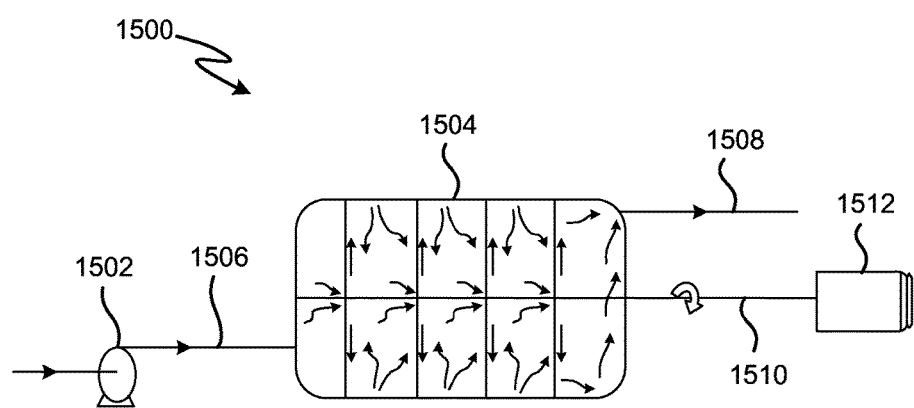
FIG. 15 is a schematic of a fluid treatment system of FIG. 1 and that has defined therein fluid flow paths, according to one embodiment of the present arrangements and that are disposed within the cavitation apparatus of FIG. 12.

FIG. 15 shows a fluid treatment system 1500, according to one preferred embodiment of the present invention and the potentially different fluid flow paths defined therein. Fluid treatment system 1500 includes a pump 1502, a fluid inlet 1506, a fluid outlet 1508, a shaft 1510, a motor 1512 and cavitation apparatus 1504, all of which are substantially similar to their counterparts, i.e., a pump 1102, a fluid inlet 1106, a fluid outlet 1108, a shaft 1110, a motor 1112 and cavitation apparatus 1104, of FIG. 11. Cavitation apparatus 1504, however, includes a cavitation unit that does not have venturi vanes fabricated on a back surface of its rear plate. As a result, the fluid flow path does not show fluid flow around the back surface of the cavitation unit.

Figure 16:
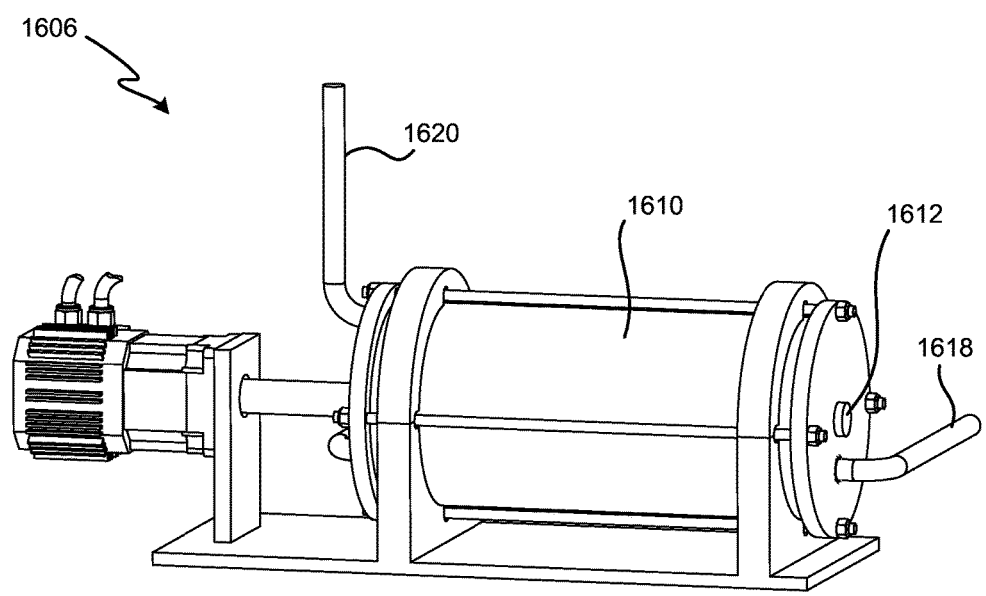
FIG. 16 shows perspective view of yet another cavitation apparatus, according to one embodiment of the present arrangements and that includes an external housing disposed around the cavitation apparatus (e.g., cavitation apparatuses shown in FIGS. 2, 7 and 12).

FIG. 16 shows a perspective view of multi-stage cavitation subassembly 1606, according to one embodiment of the present arrangements. Multi-stage cavitation subassembly 1606 includes housing 1610, shaft 1612, inlet 1618 and outlet 1620 which are substantially similar to their counterparts in FIG. 2, FIG. 7 and FIG. 12. In one arrangement, one or more cavitation units (e.g., one or more cavitation units 208 of FIG. 2, one or more cavitation units 708 of FIG. 7 and one or more cavitation units 1208 of FIG. 12) are disposed within housing 1610 and around shaft 1612, which drives rotation of one or more cavitation units when in use. One or more cavitation units facilitate hydrodynamic cavitation in a fluid, however, multi-stage cavitation subassembly 1606 may be configured to facilitate other types of cavitation in addition to hydrodynamic cavitation. For example, cavitation may be caused mechanically (e.g., using ultrasonic waves), optically (e.g., using laser beams), or by bombardment with high-energy particles (e.g., using fast-moving electrons or neutron particles). Further, a single multi-stage cavitation subassembly 1606 may incorporate different designs of cavitation units (e.g., FIGS. 3, 8A, 8B, 9A, 9B, 10A, 10B, 10C and 13).

Figure 17:
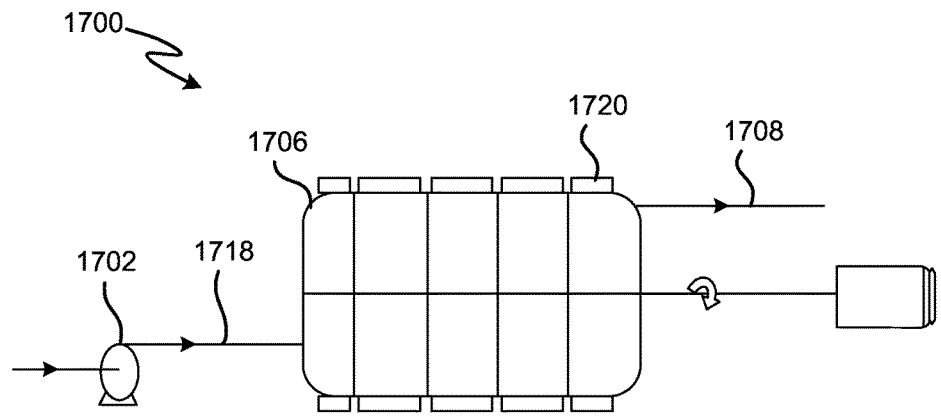
FIG. 17 shows a schematic of a fluid treatment system, according to yet another embodiment of the present arrangements and that includes one or more acoustic drivers coupled to an exterior surface of the housing shown in FIG. 16.

In one embodiment of the present arrangements, fluid treatment system may use ultrasonic waves to generate acoustic cavitation in a flowing fluid inside fluid treatment system. For example, FIG. 17 shows a fluid treatment system 1700 including one or more acoustic drivers 1720 disposed on the surface of the housing of multi-stage cavitation subassembly 1706 according to one embodiment of the present arrangements. Acoustic waves, generated by acoustic driver 1720, penetrate the housing of multi-stage cavitation subassembly 1706 and cause acoustic cavitation in the fluid flowing through of multi-stage cavitation subassembly 1706 to facilitate acoustic cavitation of the fluid. The placement of acoustic drivers, however, is not restricted to multi-stage cavitation subassembly 1706. Acoustic driver may be positioned at any location in the fluid treatment system where the fluid may undergo effective acoustic cavitation. By way of example, one or more acoustic drivers may be positioned on pump 1702, inlet 1706 and outlet 1708.

Figure 18:
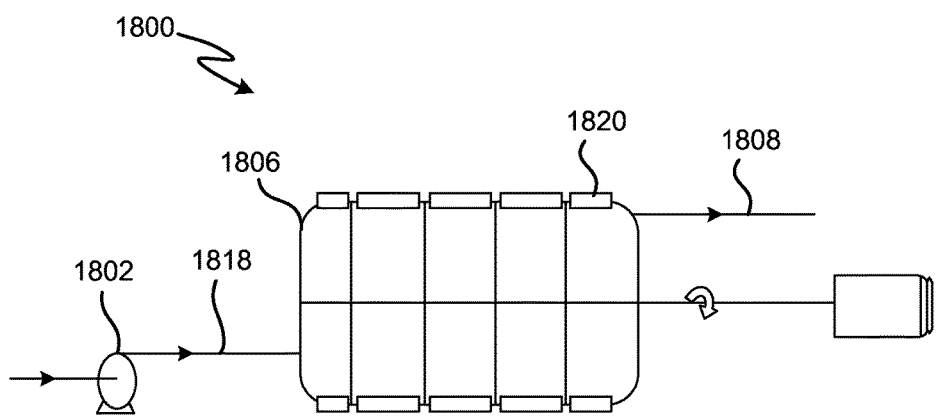
FIG. 18 shows a schematic of a fluid treatment system, according to yet another embodiment of the present arrangements and that includes one or more acoustic drivers that are embedded into the housing shown in FIG. 16.

FIG. 18 shows a fluid treatment system 1800 including one or more acoustic drivers 1820, according to another embodiment of the present arrangements, protruding through the surface of the housing of multi-stage cavitation subassembly 1806. As a result, one or more acoustic drivers 1820 are directly contacting the fluid for treatment when multi-stage cavitation subassembly 1806 is in use. In this manner, ultrasonic waves from one or more acoustic drivers 1820 cause acoustic cavitation in the fluid. Acoustic driver may be positioned at any location in the fluid treatment system such as pump 1802, inlet 1806 and outlet 1808.

In other embodiments of the present arrangements, hydrodynamic cavitation may be combined with acoustic cavitation to increase the cavitation effect in a fluid. In one embodiment of the present arrangements, one or more acoustic drivers 1720 of FIG. 17 or one or more acoustic drivers 1820 of FIG. 18 may be combined with multi-stage cavitation subassembly 206 of FIG. 2. In another embodiment of the present arrangements, one or more acoustic drivers 1720 of FIG. 17 or one or more acoustic drivers 1820 of FIG. 18 may be combined with multi-stage cavitation subassembly 706 of FIG. 7. In yet another embodiment of the present arrangements, one or more acoustic drivers 1720 of FIG. 17 or one or more acoustic drivers 1820 of FIG. 18 may be combined with multi-stage cavitation subassembly 1206 of FIG. 12.

Figure 19:
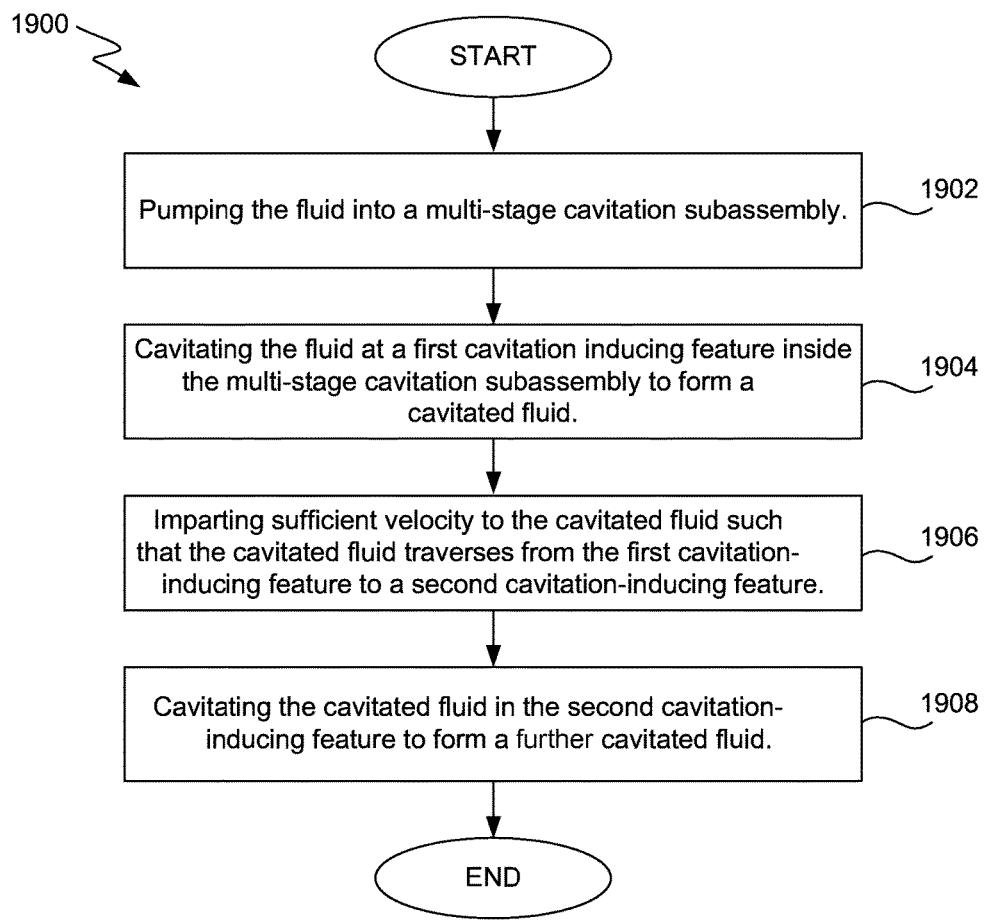
FIG. 19 shows a process flow diagram for a method of effecting multi-stage cavitation, in accordance with one embodiment of the present teachings and that shows steps which may be performed using a fluid treatment system of FIG. 1.

The present teachings also offer novel methods of treating a fluid using a fluid treatment system (e.g., fluid treatment system 100 of FIG. 1). FIG. 19 shows a method 1900, according to one embodiment of the present teachings, for treating a fluid. Method 1900 preferably begins with a step 1902, which includes pumping a fluid into a multi-stage cavitation apparatus. In one embodiment of the present teachings, pumping of the fluid to the multi-stage cavitation apparatus is carried out using a pump (e.g., pump 102 of FIG. 1). The present teachings also contemplate multiple embodiments of the multi-stage cavitation apparatus. In one embodiment of the present teachings, the multi-stage cavitation apparatus may include a cavitation unit with a rotating impeller having one or more vanes and a stationary stator (e.g., rotating impeller 330 having one or more vanes 332 and stationary stator 336 of FIG. 3). In another embodiment of the present teachings, the multi-stage cavitation apparatus may include a cavitation unit with a rotating vane plate positioned between a front plate and/or a back plate (e.g., rotating vane plate 850, front plate 854 and back plate 856 of FIG. 8). In yet another embodiment of the present teachings, the multi-stage cavitation apparatus may include a cavitation unit with a cavitation disc sandwiched between a forward disc and/or a rear disc (e.g., cavitation disc 1330, forward disc 1332 and rear disc 1334 of FIG. 13).

Process 1900 then proceeds to a step 1904, which includes cavitating the fluid at a first cavitation-inducing feature inside multi-stage cavitation apparatus to form a cavitated fluid. In one embodiment of the present teachings, the first cavitation-inducing feature is one or more venturi-shaped slots (e.g., venturi-shaped slots 340 of FIG. 3). In another embodiment of the present teachings, the first cavitation-inducing feature may be venturi-shaped vanes (e.g., venturi-shaped vanes 852 of FIG. 8) on a front surface and/or a back surface of a rotating vane. In yet another embodiment of the present teaching, the first cavitation-inducing feature may be one or more apertures (e.g., one or more cavitation apertures 1246 of FIG. 12) disposed on a cavitation disc. In each embodiment, fluid flowing undergoes cavitation due to a rapid change in pressure and velocity as it traverses the cavitation-inducing feature.

A step 1906 next includes imparting sufficient velocity to the cavitated fluid such that the cavitated fluid traverses from said the first cavitation-inducing feature to a second cavitation-inducing feature. The present teachings recognize that centrifugal force increases as the fluid moves away from the center and towards the periphery and also that after the fluid undergoes cavitation at the first cavitation-inducing feature, the fluid undergoes a head loss. Against this backdrop, the velocity-imparting component of the present arrangements is able to propel the fluid stream to a second cavitation-inducing feature because of the relatively higher fluid velocities farther from the center region of the cavitation unit.

Process 1900 then proceeds to a step 1908, which includes cavitating the cavitated fluid in the second cavitation-inducing feature to form a further cavitated fluid. In one embodiment of the present teachings, the second cavitation-inducing feature may be in the same cavitation unit as the first cavitation-inducing feature. By way of example, in an embodiment that includes a stator 340 of FIG. 3, with two layers of venturi-shaped vanes, the cavitated fluid from the first venturi flows to a second venturi on the same stator. As another example, vane plate 1050' of FIG. 10B includes two sequentially located venturis (e.g., first venturi 1062' and second venturi 1064'). The cavitated fluid exiting the first venturi is forced, by the centrifugal force of the rotating vane, into the second venturi. Consequently, the fluid is cavitated a second time.

In another embodiment of the present teachings, the second cavitation-inducing feature may be in a different cavitation unit. By way of example, in an embodiment that includes a stator 340 of FIG. 3 with one layer of venturi-shaped vanes, the second cavitation-inducing feature may be on another cavitation unit downstream from the first cavitation unit. Therefore, the cavitated fluid exits the venturi-shaped slots of the first cavitation unit and flows downstream to the second cavitation unit.

The present teachings contemplate other embodiments of processes treating a fluid. In one embodiment of the present teachings, the process of treating a fluid includes adding or removing solids to the fluid before pumping the fluid into the multi-stage cavitation apparatus. Adding or removing solids to the fluid may affect the intensity of the cavitation within the fluid.

In another embodiment of the present teachings, inducing cavitation in a fluid include use of an additive, such as an adsorbent in the cavitation systems and processes. Adsorption may be used to remove the dissolved salts and organic pollutants in the fluid. Examples of adsorbents include activated carbon, clay, soil, bituminous coal, montmorillonite, chitosan, fly ash, alumina, bentonite, zeolite, β-cyclodextrin, dead mushrooms, silica gel, diatomaceous earth, Amberlite by Dow Chemical Company of Midland, Michigan, ion exchange resins, various synthetic polymers such as SP206 (a polystyrene matrix cross-linked with divinyl benzene), and polyethylene (terephthalate). One role of cavitation is to increase the surface area of the added adsorbents so that more surface area is available per unit mass of adsorption. Cavitation may break down big millimeter-sized particles into small micron sized or even nano-sized particles, creating a large surface area for adsorption. Cavitation may assist adsorption in at least two ways: (1) increased in mass transfer coefficient; and (2) increasing the surface area.

In one embodiment of the present teachings, a device is provided which has hydrodynamic cavitation as well as an additive. The additive may have a dual role. The additive may act as a cavitation enhancer providing more nuclei for cavitation inception. The additive may also act as an adsorbent, an adsorptive material capable of adsorption. Thus, the adsorbent may help a cavitation phenomenon and the cavitation helps the adsorption phenomenon. There may be a synergy between the cavitation phenomenon and the adsorption phenomenon.

As the liquid passes through the above-described multi-stage cavitation subassembly (including a cavitation-inducing feature) at a high velocity, the pressure of the liquid reduces below the vapor pressure of the liquid at or near the minimum cross-sectional area (called "throat"). This reduction in pressure causes some of the liquid to evaporate and causes the cavitation bubbles to form which eventually grow further downstream and collapse as they reach towards the end of the diverging section due to increase in the pressure of the liquid by pressure recovery. This phenomenon of formation, growth and subsequent collapse of gas/vapor bubbles is called cavitation. The cavitation bubbles generally collapse so fast (speed of collapse is faster than speed of sound in the liquid) that the contents of the bubble may not have enough time to escape through the interfacial boundary of the bubble by diffusion. Hence, the contents of the bubbles may get compressed adiabatically, which causes a tremendous increase in temperature and pressure inside the bubble. At such high local temperatures inside the imploding cavitation bubbles, the weak intermolecular forces (in the form of bonds) in the gas/vapor molecules may get disrupted. This thermal dissociation or breakage of molecules may give rise to oxidative species like HO, $HO_2$, O radicals and peroxy compounds such as $H_2O_2$ and $O_3$ inside and in the interfacial region of the bubble. These short-lived species are thrown out of the bubble upon collapse and they may then react with solute molecules, e.g., the organic compounds in the fluid at the outer shell of the bubble.

Synergized effect of highly oxidative species with high local temperatures may cause the organic molecule to undergo oxidative degradation. The volatile organic chemical compounds such as halomethanes, for example, chloroform, carbon tetrachloride and trichloroethane, may evaporate during cavitation bubble formation and enter the cavitation bubbles. These compounds may then be exposed to the high temperatures inside the bubble and decompose into less hazardous compounds by pyrolysis or combustion reaction. Thus, each cavitation bubble may be thought of as a micro reactor or a microincinerator for these volatile organic hazardous chemical compounds. The non-volatile organic hazardous chemical compounds, such as phenols, chloro-phenols, nitro-phenols and parathion, however, may not enter the cavitation bubbles due to their lower vapor pressure and remain near the interface of the cavitation bubbles and surrounding liquid. They may be attacked and mineralized into lesser hazardous chemical intermediates and end products by the various oxidizing radical species, such as the hydroxyl radicals, formed by the decomposition of water vapor inside the cavitation bubbles and may be thrown out during the implosive collapse. These radicals may be highly reactive and are capable of oxidizing almost all contaminants in water. Such oxidation may be represented by following reactions:

$H_2O \rightarrow OH° + H°$ $OH° + OH° \rightarrow H_2O_2$ $OH° + OH° \rightarrow H_2O + O$ $OH° + OH^- \rightarrow H_2 + O_2$ $H° + O_2 \rightarrow HO°_2$ $HO°_2 + H° \rightarrow H_2O_2$ $HO°_2 + HO°_2 \rightarrow H_2O_2 + O_2$ $OH° + H_2O \rightarrow H_2O_2 + O°$ $H_2O + O° \rightarrow H_2O_2$ $H° + H° \rightarrow H_2$ $H° + OH° \rightarrow H_2O$ Aqueous pollutants+oxidizing species→degraded products In this manner, enhanced cavitation achieved from multi-stage cavitation processes and systems of the present teachings are useful for, among other things, treating various types of fluid streams.

Although illustrative embodiments of the present teachings and arrangements have been shown and described, other modifications, changes, and substitutions are intended. Accordingly, it is appropriate that the appended claims be construed broadly and in a manner consistent with the scope of the disclosure, as set forth in the following claims.

What is claimed is:

1. A multi-stage cavitation subassembly comprising:
a first cavitation-inducing feature for cavitating a fluid chosen from a group comprising a venturi flow path, sequentially arranged apertures of reducing diameters, and venturi-shaped slot;
a second cavitation-inducing feature chosen from a group comprising a venturi flow path, sequentially arranged apertures of reducing diameters, and venturi-shaped slot that is located downstream from said first cavitation-inducing feature and is designed to cavitate said fluid after said fluid has undergone cavitation in said first cavitation-inducing feature,
a velocity-imparting component chosen from a group comprising pump, rotating impeller and rotating vane that, in a state of motion and when in contact with said fluid, imparts said fluid with sufficient velocity after said fluid has undergone cavitation in said first cavitation-inducing feature so that said fluid traverses from said first cavitation-inducing feature to said second cavitation-inducing feature; and
a housing to enclose said first cavitation-inducing feature and said second cavitation-inducing feature.

2. The multi-stage cavitation subassembly of claim 1, wherein said first and said second cavitation-inducing features include a structure that produces hydrodynamic cavitation.

3. The multi-stage cavitation subassembly of claim 1, wherein during a rotational motion of said velocity-imparting component and when said fluid strikes said velocity-imparting component, said velocity-imparting component imparts said fluid with sufficient velocity so that said fluid may traverse from said first cavitation-inducing feature to said second cavitation-inducing feature.

4. The multi-stage cavitation subassembly of claim 3, wherein when said fluid strikes said velocity-imparting component, said velocity-imparting component imparts said fluid with velocity in a radial direction inside said multi-stage cavitation subassembly.

5. The multi-stage cavitation subassembly of claim 1, further comprising a shaft which when coupled to said velocity-imparting component enables motion of said fluid in a radial direction.

6. The multi-stage cavitation subassembly of claim 1, further comprising a motor, which enables motion of said velocity-imparting component.

7. The multi-stage cavitation subassembly of claim 1, further comprising a flow-guiding feature that guides fluid flow from said first cavitation-inducing feature to said second cavitation-inducing feature and said flow guidance feature is proximate said first cavitation-inducing feature or said second cavitation-inducing feature.

8. The multi-stage cavitation subassembly of claim 7, wherein said flow-guiding feature is proximate, but stationary relative to said velocity-imparting component when said velocity-imparting component is in motion.

9. The multi-stage cavitation subassembly of claim 7, wherein said flow-guiding feature is proximate to said velocity-imparting component and said flow-guiding feature and said velocity-imparting component are in motion.

10. The multi-stage cavitation subassembly of claim 1, further comprising a fluid flow path that traverses through n number of multiple cavitation-inducing features and wherein n is a number that ranges from between about 12 and about 432.

11. The multi-stage cavitation subassembly of claim 1, wherein said rotating impeller is located proximate to a stationary stator with one or more slots disposed around a periphery of said stationary stator such that said fluid propelled by said rotating impeller strikes and passes through one or more of said slots.

12. The multi-stage cavitation subassembly of claim 11, wherein one or more of said slots, which have a surface in the shape of one or more venturis, serve as fluid flow paths.

13. The multi-stage cavitation subassembly of claim 1, wherein said first cavitation-inducing feature and/or said second cavitation-inducing feature are fabricated on one member chosen from a group comprising stator, vane and static body having defined therein multiple apertures that allow flow of said fluid.

14. The multi-stage cavitation subassembly of claim 13, wherein said vane is coupled to a forward rotating plate and/or a rear rotating plate, each of which has defined therein a centrally located aperture to allow said fluid to be drawn in, flow through said aperture and contact said vane.

15. The multi-stage cavitation subassembly of claim 14, wherein said forward rotating plate is coupled to an upstream surface of said vane and/or said rear rotating plate is coupled to a downstream surface of said vane such that when said forward rotating plate and/or said rear rotating plate rotates when said vane rotates.

16. The multi-stage cavitation subassembly of claim 13, wherein said static body is adjacent to one or more rotating vanes having defined therein one more apertures for receiving a fluid and one or more of said apertures are larger than said multiple apertures of said static body.

17. The multi-stage cavitation subassembly of claim 1, further comprising one or more ultrasonic drivers disposed on and/or within said multi-stage cavitation subassembly and/or a stationary housing to facilitate acoustic cavitation within said fluid.

18. A fluid treatment system comprising:
a multi-stage cavitation subassembly comprising:
  a first cavitation-inducing feature for cavitating a fluid chosen from a group comprising a venturi flow path, sequentially arranged apertures of reducing diameters, and venturi-shaped slot;
  a second cavitation-inducing feature chosen from a group comprising a venturi flow path, sequentially arranged apertures of reducing diameters, and venturi-shaped slot that is located downstream from said first cavitation-inducing feature and is designed to cavitate said fluid after said fluid has undergone cavitation in said first cavitation-inducing feature; and
  a velocity-imparting component chosen from a group comprising pump, rotating impeller and rotating vane that, in a state of motion and when in contact with said fluid, imparts said fluid with sufficient velocity after said fluid has undergone cavitation in said first cavitation-inducing feature so that said fluid may traverse from said first cavitation-inducing feature to said second cavitation-inducing feature;
a pump that introduces said fluid inside said multi-stage cavitation subassembly; and
a pressure controller, which is different than said pump, that controls the fluid pressure inside said multi-stage cavitation subassembly.

19. The fluid treatment system of claim 18, further comprising a fluid inlet and a fluid outlet, each of which is coupled to said multi-stage cavitation subassembly, and wherein said fluid inlet receives fluid inside said multi-stage cavitation subassembly to undergo treatment and said fluid outlet removes fluid after treatment inside said multi-stage cavitation subassembly.

20. A fluid treatment method comprising:
adding solids to said fluid;
pumping said fluid and said added solids into a multi-stage cavitation subassembly;
cavitating said fluid at a first cavitation-inducing feature inside said multi-stage cavitation subassembly to form a cavitated fluid, wherein said first cavitation-inducing feature is chosen from a group comprising a venturi flow path, sequentially arranged apertures of reducing diameters, and venturi-shaped slot;
imparting sufficient velocity to said cavitated fluid such that said cavitated fluid traverses from said first cavitation-inducing feature to a second cavitation-inducing feature chosen from a group comprising a venturi flow path, sequentially arranged apertures of reducing diameters, and venturi-shaped slot; and
cavitating said cavitated fluid in said second cavitation-inducing feature to form a further cavitated fluid;
wherein said added solids effect cavitation in said first cavitation-inducing feature and in said second cavitation-inducing feature.

21. The fluid treatment method of claim 20, wherein said cavitating said fluid and said cavitating said cavitated fluid includes effecting hydrodynamic cavitation on said fluid and said cavitated fluid, respectively.

22. The fluid treatment method of claim 20, further comprising removing solids that are present in said fluid before pumping said fluid into said multi-stage cavitation subassembly to effect cavitation in said first cavitation-inducing feature and in said second cavitation-inducing feature.

23. The fluid treatment method of claim 20, further comprising adding an absorbent to remove and/or dissolve compounds in said fluid.

24. The fluid treatment method of claim 23, wherein said adsorbent is a material chosen from a group comprising carbon, clay, soil, bituminous coal, montmorillonite, chitosan, fly ash, alumina, bentonite, zeolite, β-cyclodextrin, dead mushrooms, silica gel, diatomaceous earth, ion exchange resins, SP206, and polyethylene.

25. The fluid treatment method of claim 20, further comprising acoustically cavitating said fluid with one or more ultrasonic drivers coupled to said multi-stage cavitation subassembly to induce acoustic cavitation in said fluid within said multi-stage cavitation subassembly.

26. The fluid treatment method of claim 20, further comprising acoustically cavitating said fluid with one more ultrasonic drivers contacting said fluid within said multi-stage cavitation subassembly.

27. The fluid treatment method of claim 20, wherein said imparting includes putting in motion or rotating a velocity-imparting component that propels said fluid from said first cavitation-inducing feature to said second cavitation-inducing feature when said velocity-imparting component contacts said fluid.

* * * * *